US008941904B2

(12) United States Patent
Eto et al.

(10) Patent No.: US 8,941,904 B2
(45) Date of Patent: Jan. 27, 2015

(54) HOLOGRAM SHEET AND HOLOGRAM OBSERVATION SHEET USING SAME, AND BLINDING DEVICE

(75) Inventors: Koji Eto, Tokyo (JP); Yasuyuki Oyagi, Tokyo (JP); Mitsuru Kitamura, Tokyo (JP); Masachika Watanabe, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 11/478,962

(22) Filed: Jun. 29, 2006

(65) Prior Publication Data
US 2007/0070477 A1 Mar. 29, 2007

(30) Foreign Application Priority Data

Jul. 4, 2005 (JP) .................................. 2005-194490
Jul. 6, 2005 (JP) .................................. 2005-198164

(51) Int. Cl.
*G02B 5/32* (2006.01)
*G02B 1/00* (2006.01)
*G03H 1/16* (2006.01)
*G03H 1/00* (2006.01)
*G03H 1/02* (2006.01)
(Continued)

(52) U.S. Cl.
CPC .............. *G03H 1/16* (2013.01); *G03H 1/0005* (2013.01); *G03H 1/0244* (2013.01); *G03H 2001/0055* (2013.01); *G03H 2001/2234* (2013.01); *G03H 2001/306* (2013.01); *G03H 2223/12* (2013.01); *G03H 2250/10* (2013.01); *G03H 1/2249* (2013.01); *G03H 2210/20* (2013.01)
USPC .......... 359/15; 359/2; 359/32; 359/29; 283/86

(58) Field of Classification Search
USPC ................... 359/2, 29, 35, 24; 283/86; 430/1
See application file for complete search history.

(56) References Cited

U.S. PATENT DOCUMENTS 4,856,857 A * 8/1989 Takeuchi et al. .................. 359/3
4,921,352 A * 5/1990 Adolfs et al. .................. 356/458
(Continued)

FOREIGN PATENT DOCUMENTS

JP        5-94866 U     12/1993
JP        06-332379 A   12/1994
(Continued)

OTHER PUBLICATIONS pp. 23-41 of the $22^{nd}$ winter seminar text "h ologram and diffraction type optical element—from basic theory to industrial application—" organized by the Optical Society of Japan (Japan Society of Applied Physics).

(Continued)

*Primary Examiner* — Audrey Y Chang
(74) *Attorney, Agent, or Firm* — Ladas & Parry LLP

(57) ABSTRACT

A main object of the present invention is to provide a hologram observation sheet with a transmission type hologram formed integrally with other members, to be attached with various members for the use as for example an advertising medium or a decoration member. To achieve the object, the invention provides a hologram sheet comprising: a transparent substrate, a hologram layer formed on the transparent substrate and having a transmission type Fourier transform hologram region having the function of transforming a light beam incident from a point light source to a desired optical image, and a pressure-sensitive adhesive layer.

7 Claims, 12 Drawing Sheets

(51) Int. Cl.
*G03H 1/22* (2006.01)
*G03H 1/30* (2006.01)

(56) References Cited

U.S. PATENT DOCUMENTS

| | | | |
|---|---|---|---|
| 5,281,499 A * | 1/1994 | Bussard | 430/1 |
| 5,426,520 A * | 6/1995 | Kakae et al. | 359/2 |
| 5,492,370 A * | 2/1996 | Chatwin et al. | 283/110 |
| 5,546,198 A | 8/1996 | van der Gracht et al. | |
| 6,017,657 A * | 1/2000 | Mentz et al. | 430/1 |
| 6,317,227 B1 * | 11/2001 | Mizutani et al. | 359/15 |
| 6,344,909 B1 * | 2/2002 | Grossetie et al. | 359/9 |
| 6,522,311 B1 * | 2/2003 | Kadowaki et al. | 345/7 |
| 6,731,416 B2 * | 5/2004 | Hazzard | 359/24 |
| 6,844,945 B2 * | 1/2005 | Kitamura | 359/2 |
| 2001/0039771 A1 * | 11/2001 | Town | 52/171.3 |

FOREIGN PATENT DOCUMENTS

| | | |
|---|---|---|
| JP | 10-153943 | 6/1998 |
| JP | 2002-244218 A | 8/2002 |
| JP | 2004-77548 | 3/2004 |
| JP | 2004-126535 | 4/2004 |
| JP | 2005-099090 A | 4/2005 |
| JP | 2005-103957 A | 4/2005 |

OTHER PUBLICATIONS pp. 33-36 of "Butsurigaku Sensho 22 Holography" written by Junpei Tsujiuchi (published by Shokabo Publishing Co., Ltd. (Nov. 5, 1997).

* cited by examiner

HOLOGRAM SHEET AND HOLOGRAM OBSERVATION SHEET USING SAME, AND BLINDING DEVICE

BACKGROUND OF THE INVENTION

1. Field of the Invention

The present invention relates to a hologram observation sheet for having a predetermined image or message reproduced in the vicinity of the point light source to be observed at the time of observing a point light source through a hologram, to be bonded onto for example a window pane, so as to be used such as for an advertisement medium, a decoration member or various kinds of filters. Furthermore, the present invention relates to a blinding device for having a predetermined image or message reproduced in the vicinity of the point light source to be observed at the time of observing the source through a predetermined position, using in particular a phase type Fourier transform hologram in a binding device which is not showing a transmitted background sharply, and a method for producing a blinding device.

2. Description of the Related Art

Recently, various articles such as glasses or paper fans, using a transmission type hologram have been proposed (for example, Japanese Patent Application Laid Open (JP-A) Nos. 2004-126535 and 2004-77548). However, according to any of them, a transmission type hologram and another member can hardly be formed integrally so that they are produced by preliminarily producing only a transmission type hologram portion, and interposing the transmission type hologram between other members. Therefore, a problem is involved in that the production process is complicated, and it can hardly be used for various applications.

On the other hand, conventionally, as a blinding device, there is a frosted glass, a pattern glass, a blind, or a roll screen as an example.

Moreover, the specification of the U.S. Pat. No. 5,546,198 proposes hologram eyeglasses. The hologram eyeglasses have the configuration as shown in the perspective view of FIG. 13A. That is, two transmission type holograms 32, 33 are set in the frames for eyes of an eyeglass frame 31. In viewing a scene including light sources of small areas 34, 35, 36, 37 as shown in FIG. 13B, while wearing the eyeglasses using the transmission type holograms 32, 33, it appears, for example as shown in FIG. 13C. Alternatively, the patterns "NOEL" 38, 39, 40, 41 appear overlapped in the vicinity of the light sources 34, 35, 36, 37. That is, it is observed as a scene with the light sources of a small area in the real scene of FIG. 13B replaced respectively by the pattern "NOEL" 38, 39, 40, 41 selected in advance. As the transmission type holograms 32, 33 having such characteristics, a Fourier transform hologram of the above-mentioned pattern "NOEL" provided as a computer generated hologram (Fraunhofer hologram) is used.

FIG. 14A is a flow chart showing a production method for such a transmission type hologram (JP-A No. 10-153943). FIG. 14B is a schematic diagram for explaining the flow chart. In the step 101, an original image 51 is produced. Then, in the step 102, a Fourier transform image 52 of the original image is produced using a computer. Then, in the step 103, a multi-valued Fourier transform image 53 is produced by multi-valuing the Fourier transform image 52 to more than the binary system. Then, in the step 104, simulation of a reproduced image is carried out. The simulation is for examining whether or not the process in each of the above-mentioned steps has been carried out appropriately by obtaining a reproduced image 54 through applying an inverse Fourier transform to the multi-valued Fourier transform image 53. Then, in the step 105, the obtained multi-valued Fourier transform image is arranged to a desired range. For example, by arranging four binarized Fourier transform images 53, a computer generated hologram 55 is obtained. In reality, the image 53 of the minimum unit is arranged by for example 10 each in the vertical and lateral directions. Then, in the step 106, an original master for copying for the computer generated hologram 55 with such an arrangement is produced using for example a semiconductor process (photolithography and etching). Then, in the step 107, the concavo-convex relief pattern of the original master for copying is copied on for example an ultraviolet ray curing resin to obtain transmission type holograms 32, 33.

Moreover, as a production method for a computer generated hologram (CGH corresponding to the above-mentioned multi-valued Fourier transform image 53) for example, the Gerchberg-Saxton iterative calculating method as disclosed in pp. 36-39 of the $22^{nd}$ winter seminar text "hologram and diffraction type optical element—from basic theory to industrial application—" organized by the Optical Society of Japan (Japan Society of Applied Physics) is known. The method will be explained briefly with reference to FIGS. 15 to 17.

FIG. 15 is a diagram schematically showing a computer generated hologram 60 and an image area 70 reproduced thereby. The computer generated hologram 60, as a Fourier transform hologram, comprises an assembly of minute cells 61 having a vertical direction (y axis direction) size $\delta y$ and a lateral direction (x axis direction) size $\delta x$, arranged like a lattice, with each cell 61 provided with only the phase information. The cells 61 are disposed by $2m$ pieces in the x axis direction and $2n$ pieces in the y axis direction.

On the other hand, an image area 70 provided sufficiently remotely from the computer generated hologram 60 is an assembly of cells 71 disposed by $2m$ pieces in the x axis direction and $2n$ pieces in the y axis direction, corresponding to the computer generated hologram 60. Each cell 71 has a vertical direction (y axis direction) size $\Delta y$ and a lateral direction (x axis direction) size $\Delta x$, and the entire image area 70 has an x axis direction length of Lx and a y axis direction length of Ly.

The x axis direction length Lx and the y axis direction length Ly of the image area 70 each relates to the x axis direction size $\delta x$ and the y axis direction size $\delta y$ of the cell 61 of the computer generated hologram 60. They can be represented by the diffraction angle from the computer generated hologram 60 (since the image area 70 is provided at a position sufficiently remote from the computer generated hologram 60, Lx, Ly can be represented by an angle preferably). Lx corresponds to the range between the ± primary diffraction light of a diffraction lattice having a spatial frequency $1/(2\delta x)$, and Ly corresponds to the range between the ± primary diffraction light of a diffraction lattice having a spatial frequency $1/(2\delta y)$. This corresponds to the fact that the maximum spatial frequency recorded in the computer generated hologram 60 is $1/(2\delta x)$ in the x axis direction, and $1/(2\delta y)$ in the y axis direction.

With such a positional arrangement, in the case a parallel light 80 of a predetermined wavelength is incident from the front surface of the computer generated hologram 60, a diffraction light 81 is generated on the rear surface side of the computer generated hologram 60 so that the pattern recorded in the computer generated hologram 60 is reproduced in the remote image area 70.

Here, in order to facilitate understanding, the amplitude distribution (pixel value) of the original image in the reproduced image surface 70 is represented as AIMG (x, y), the phase distribution of the original image in the reproduced image surface 70 as φIMG (x, y), the amplitude distribution of the hologram surface 60 as AHOLO (u, v) and the phase distribution in the hologram surface as φHOLO (u, v). As shown in FIG. 16, in the step 201, the pixel value of the original image to be recorded is provided as the AIMG (x, y) in the reproduced image surface 70 for initializing the phase distribution of the original image to a random value, and in the step 202, the Fourier transform is applied to the initialized value. In the step 203, a constraints for setting the amplitude distribution AHOLO (u, v) in the hologram surface 60 obtained by the Fourier transform to 1, and the phase distribution φHOLO (u, v) to a predetermined multi-value (quantinization) is provided. After providing such constraints, in the step 204, the Fourier inverse transform is applied to the amplitude distribution AHOLO (u, v) and the phase distribution φHOLO with the constraints applied. In the step 205, in the case the amplitude distribution AIMG (x, y) in there produced image surface 70 obtained by the Fourier inverse transform is substantially equal to the pixel value of the original image by the convergent criterion, the phase distribution φHOLO (u, v) processed to be a multi-value (quantinization) in the step 203 provides the phase distribution to be supplied to the cells 61 of the computer generated hologram 60. In the case the amplitude distribution AIMG (x, y) obtained by the Fourier inverse transform is not judged equal to the pixel value of the original image in the convergent criterion of the step 205, the constraints of providing the pixel value of the original image instead of the amplitude distribution AIMG (x, y) obtained by the Fourier inverse transform and leaving the phase distribution φIMG (x, y) obtained by the Fourier inverse transform as it is, is provided in the step 206. After providing the constraints, a loop of the steps 202→203→204→205→206 is repeated until the condition of the step 205 is satisfied (converged) so as to obtain a final computer generated hologram 60 desired.

Without carrying out the multi-value process for the phase distribution φHOLO (u, v) in the step 203, a predetermined multi-value process may be carried out after satisfying the condition of the step 205.

From the multi-valued phase distribution φHOLO (u, v) accordingly obtained, the depth distribution of the real hologram is calculated. The phase distribution φHOLO (u, v) is converted to the depth D (u, v) of the computer generated hologram 60 based on the following formula (1):

$$D(u,v)=\lambda\varphi HOLO(u,v)/\{2\pi(n1-n0)\} \qquad (1).$$

Here, λ is the used central wavelength, and n1, n0 are the refractive indexes of the two materials comprising the transmission type hologram. In the case of the transmission type, as shown in the cross-sectional view of FIG. 17, the computer generated hologram 60 can be obtained by forming a relief pattern 83 of the depth D (u, v) obtained by the above-mentioned formula (1). The case of FIG. 17 is an example with the φHOLO (u, v) multi-valued in the four stages of 0, π/2, π, 3π/2. The above-mentioned coordinates (u, v) in the hologram surface 60 are for distinguishing from the coordinates (x, y) in the reproduced image surface 70 so that as to the coordinate axis directions, the u axis direction corresponds to the x axis direction, and v axis direction corresponds to the y axis direction, respectively.

Moreover, in addition thereto, as the prior art, pp. 33-36 of "Butsurigaku Sensho 22 Holography" written by Junpei TSUJIUCHI (published by SHOKABO PUBLISHING CO., Ltd. (Nov. 5, 1997) can also be presented.

However, the above-mentioned conventional blinding devices proposed are simply for a single purpose of preventing the transmitted background from being seen sharply without providing the optical design property so that most of them have ordinary and dull appearances. Moreover, the optical information transmission is not possible in the conventional blinding devices.

Moreover, as to those for transforming a point light source to a desired pattern using a hologram for a blinding device, due to the extreme difficulty for realizing a large size, at present, those of a large size are not produced, and the production method therefor has not yet been established.

SUMMARY OF THE INVENTION

Then, a hologram observation sheet with a transmission type hologram formed integrally with other members, to be attached with various members for the use as for example an advertising medium or a decoration member, is desired. Furthermore, a blinding device having the optical design property with an interesting appearance, capable of realizing the optical information transmission, to be used for the various applications, and a production method for a blinding device are also desired.

The present invention provides a hologram sheet comprising: a transparent substrate; a hologram layer formed on the above-mentioned transparent substrate and having a transmission type Fourier transform hologram region with a function of transforming a light beam incident from a point light source to a desired optical image; and a pressure-sensitive adhesive layer.

According to the present invention, since the above-mentioned pressure-sensitive adhesive layer is formed, the hologram sheet can be attached with a desired member such as a glass window so that the hologram sheet can be used for example as an advertising medium or a decoration member.

Moreover, the present invention provides a hologram observation sheet using the above-mentioned hologram sheet, wherein the above-mentioned hologram layer is an image transforming layer comprising; the above-mentioned transmission type Fourier transform hologram region, and a non hologram region which is other than the transmission type Fourier transform hologram region and without the above-mentioned function, and the above-mentioned pressure-sensitive adhesive layer is formed on the surface of the above-mentioned transparent substrate on the opposite side of the side with the above-mentioned image transforming layer formed, or the above-mentioned non hologram region of the image transforming layer.

According to the present invention, since the above-mentioned pressure-sensitive adhesive layer is formed, the hologram observation sheet can be attached with a desired member such as a glass window so that the hologram observation sheet can be used such as for an advertising medium or a decoration member. Moreover, at the time, since the pressure-sensitive adhesive layer is formed on the above-mentioned transparent substrate or on the above-mentioned non hologram region, the diffractive index difference of a light beam in the above-mentioned transmission type Fourier transform hologram region of the image transforming layer can remain unchanged. Consequently, a hologram observation sheet capable of preferably observing an optical image obtained by the transmission type Fourier transform hologram can be provided. Furthermore, according to the present invention, since the transmission type Fourier transform hologram region is formed in the image transforming layer, a hologram observation sheet can be produced efficiently without the need of additionally attaching or sandwiching a member having the function of a transmission type Fourier transform hologram, and thus it is advantageous.

According to the above-mentioned invention, a self supporting property substrate may be formed between the above-mentioned transparent substrate and the above-mentioned pressure-sensitive adhesive layer in the case the pressure-sensitive adhesive layer is formed on the surface of the transparent substrate opposite to the side with the above-mentioned image transforming layer formed, or between the above-mentioned non hologram region and the pressure-sensitive adhesive layer in the case the pressure-sensitive adhesive layer is formed on the non hologram region of the image transforming layer. In this case, a hologram observation sheet with a high self supporting property can be provided.

Moreover, the present invention provides a hologram observation sheet using the above-mentioned hologram sheet, wherein the above-mentioned hologram layer is an image transforming layer comprising; the above-mentioned transmission type Fourier transform hologram region, and a non hologram region which is other than the transmission type Fourier transform hologram region and without the above-mentioned function: a protection layer is formed on the transmission type Fourier transform hologram region of the image transforming layer: and the above-mentioned pressure-sensitive adhesive layer is formed on the above-mentioned protection layer.

According to the present invention, since the above-mentioned pressure-sensitive adhesive layer is formed, the hologram observation sheet can be attached with a desired member such as a glass window so that the hologram observation sheet can be used such as for an advertising medium or a decoration member. Moreover, according to the present invention, since the above-mentioned protection layer is formed, the pressure-sensitive adhesive layer can be formed also on the above-mentioned transmission type Fourier transform hologram region without deteriorating the function of the transmission type Fourier transform hologram region. Furthermore, according to the present invention, since the image transforming layer having the transmission type Fourier transform hologram region is formed, a hologram observation sheet can be produced efficiently without the need of additionally attaching or sandwiching a transmission type Fourier transform hologram, and thus it is also advantageous.

According to the above-mentioned invention, a self supporting property substrate may be formed between the above-mentioned protection layer and the above-mentioned pressure-sensitive adhesive layer. In this case, a high self supporting property can be provided to a hologram observation sheet of the present invention.

Moreover, according to the present invention, the above-mentioned pressure-sensitive adhesive layer may be an adhesive layer having the sticky property, or it may be a re-peelable adhesive layer having the both characteristics of the adhesive property and the re-peelable property. In the case the pressure-sensitive adhesive layer is an adhesive layer, the hologram observation sheet can be attached firmly to a desired member such as a glass window by the pressure-sensitive adhesive force. Moreover, in the case the pressure-sensitive adhesive layer is a re-peelable adhesive layer, the hologram observation sheet can be attached to a desired member such as a glass window by the adhesive force. Thereby, it can be peeled off from the member to be bonded leaving no trace of an adhesive, or the like so that damage to the member after removal can be prevented.

In the above-mentioned invention, a printing layer may be formed on the above-mentioned transparent substrate. Thereby, various kinds of printing can be carried out on the hologram observation sheet so that the hologram observation sheet can be used for wider applications.

Moreover, in the above-mentioned invention, a release substrate may be disposed on the above-mentioned pressure-sensitive adhesive layer. In this case, the member to be bonded and the pressure-sensitive adhesive layer can be attached by peeling off the release substrate immediately before attaching the hologram observation sheet with a member to be bonded. Therefor, introduction of the foreign substances between the member to be bonded and the pressure-sensitive adhesive layer can be presented, and thus it is advantageous.

Furthermore, in the present invention, the above-mentioned image transforming layer may be a surface phase type diffractive-optical element layer having a concavo-convex structure on the surface of the transmission type Fourier transform hologram region. Since the image transforming layer is provided as such a layer, the above-mentioned transmission type Fourier transform hologram region can be formed in the image transforming layer.

Moreover, the present invention provides a blinding device not showing a transmitted background sharply and using the above-mentioned hologram sheet.

According to the present invention, since the above-mentioned hologram sheet is used in a blinding device not showing a transmitted background sharply, the optical design property can be provided with an interesting appearance, and furthermore, the optical information transmission can also be enabled.

Moreover, in the above-mentioned invention, the above-mentioned hologram layer is provided as a phase type computer generated hologram. Moreover, in the above-mentioned invention, the above-mentioned hologram sheet may be: attached to a window, sandwiched between windows comprising two transparent plates, of a sliding system capable of covering a window for allowing comings and goings, or of a roll screen system capable of covering a window for allowing comings and goings. Furthermore, in the invention, the hologram layer is of a 20 μm pitch or less.

Furthermore, the present invention provides a production method for a blinding device, wherein the blinding device not showing a transmitted background sharply and having a Fourier transform hologram, comprises a step of producing the Fourier transform hologram for transforming a point light source to a desired pattern by copying an original master using a stamper.

Moreover, the present invention provides a production method for a blinding device, wherein the blinding device not showing a transmitted background sharply and having a Fourier transform hologram, comprises a step of producing the Fourier transform hologram for transforming a point light source to a desired pattern by copying an original master to a UV resin.

Moreover, the present invention provides a production method for a blinding device, wherein the blinding device not showing a transmitted background sharply and having a Fourier transform hologram, comprises a step of producing the Fourier transform hologram for transforming a point light source to desired character information or graphic information by exposing a Fourier transform image provided by Fourier transforming an original image with a step-and-repeat.

According to the production method for a blinding device as mentioned above, a large sized blinding device can be produced so as to widen the application range and enabling to be used for various applications.

According to the present invention, since the above-mentioned pressure-sensitive adhesive layer is formed, the hologram sheet can be attached to a desired member such as a glass window.

According to the present invention, since the above-mentioned pressure-sensitive adhesive layer is formed, the hologram observation sheet can be attached to a desired member such as a glass window so that the hologram observation sheet can be used for example as an advertising medium or a decoration member. Moreover, according to the present invention, the effect of producing a hologram observation sheet efficiently without additionally attaching or sandwiching a member having the function of a transmission type Fourier transform hologram can also be achieved.

According to the present invention, since the Fourier transform hologram for transforming a point light source to a desired pattern is used in the blinding device not showing a transmitted background sharply, the optical design property can be provided with an interesting appearance, and furthermore, the optical information transmission can also be achieved.

Moreover, since the above-mentioned Fourier transform hologram is produced by copying and using a stamper of an original master, copying an original master to a UV resin, or exposing with a step-and-repeat a Fourier transfer image with the Fourier transform applied to an original image in a production method for a Fourier transform hologram for transforming a point light source to a desired pattern in a blinding device not showing a transmitted background sharply, a large sized blinding device can be produced for widening the application range so as to be applied for various ones.

DESCRIPTION OF THE PREFERRED EMBODIMENT

Figure 1:
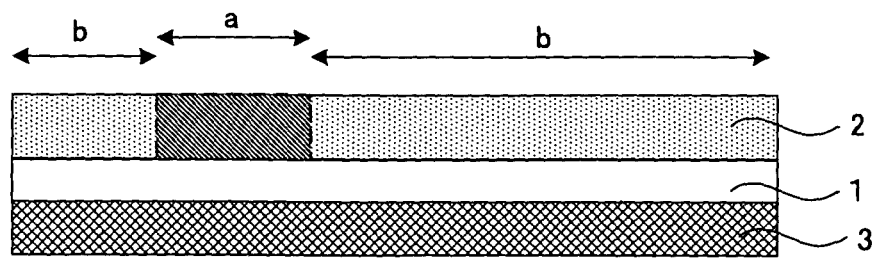
FIG. 1 is a schematic cross-sectional view showing an example of a hologram observation sheet of the present invention.

The present invention relates to a hologram sheet and a hologram observation sheet capable for having a predetermined image or message reproduced in the vicinity of the point light source to be observed at the time of observing a point light source through a hologram, to be bonded onto for example a window pane, so as to be used such as for an advertisement medium, a decoration member or various kinds of filters, and a blinding device capable for having a predetermined image or message reproduced in the vicinity of the point light source to be observed at the time of observing a point light source through a predetermined position, using in particular a phase type Fourier transform hologram in a binding device not showing a transmitted background sharply, and a method for producing a blinding device. Hereinafter, each element will be explained independently.

I. Hologram Sheet

First, the hologram sheet of the present invention will be explained. The hologram sheet of the present invention comprises: a transparent substrate; a hologram layer formed on the transparent substrate and having a transmission type Fourier transform hologram region with the function of transforming a light beam incident from a point light source to a desired optical image; and a pressure-sensitive adhesive layer. Here, the pressure-sensitive adhesive layer may be formed on the hologram layer, and furthermore, it may be formed on the surface on the side opposite to the side of the transparent substrate with the hologram layer formed.

Since the hologram sheet of the present invention comprises the pressure-sensitive adhesive layer, for example it can be bonded to a desired member such as a glass window. Thereby, the hologram sheet can be used for an advertising medium to be attached on a window pane, or the like of a vehicle for the public transportation such as a train and a bus, a decoration member to be attached on a window pane of an automobile or a house, or the like. Therefore, such a hologram sheet of the present invention can be used for example for a hologram observation sheet, a blinding device, or the like to be described later.

The hologram layer to be used for the hologram sheet of the present invention may be one formed on the transparent substrate to be described later, having a transmission type Fourier transform hologram region having the function of transforming a light beam incident from a point light source to a desired optical image, and thus it may consist of only the transmission type Fourier transform hologram region, or it may comprise the transmission type Fourier transform hologram region and a non hologram region without the above-mentioned function. Such transmission type Fourier transform hologram region and the non hologram region can be same as the transmission type Fourier transform hologram region and the non hologram region in the image transforming layer mentioned in "II. Hologram observation sheet" to be described later.

Moreover, the transparent substrate and the pressure-sensitive adhesive layer used in the hologram sheet of the present invention can be same as those explained in the first embodiment of "II. Hologram observation sheet" to be described later.

II. Hologram Observation Sheet

Next, the hologram observation sheet of the present invention will be explained. The hologram observation sheet of the present invention has two embodiments. Hereinafter, each embodiment will be explained.

A. First Embodiment

First, the first embodiment of the hologram observation sheet of the present invention will be explained. The first embodiment of the hologram observation sheet of the present invention is a hologram observation sheet using the above-mentioned hologram sheet, wherein the hologram layer is an image transforming layer comprising the transmission type Fourier transform hologram region and a non hologram region other than the transmission type Fourier transform hologram region and without the above-mentioned function, and the pressure-sensitive adhesive layer is formed on the surface of the transparent substrate on the opposite side of the side with the image transforming layer or the non hologram region of the image transforming layer.

Figure 2:
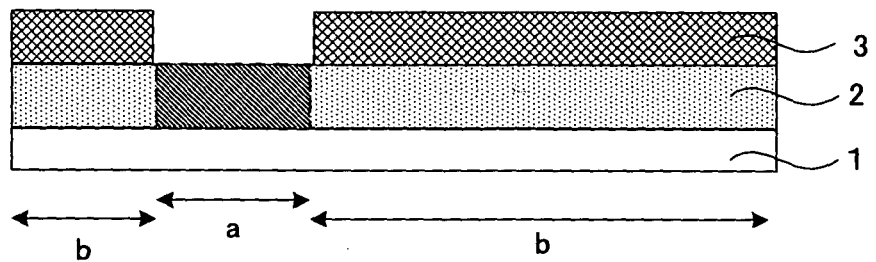
FIG. 2 is a schematic cross-sectional view showing another example of a hologram observation sheet of the present invention.

For example as shown in FIG. 1, the hologram observation sheet of this embodiment comprises a transparent substrate 1; an image transforming layer 2 formed on the transparent substrate 1, comprising a transmission type Fourier transform hologram region "a" and a non hologram region b; and a pressure-sensitive adhesive layer 3 formed on the surface on the side opposite to the side with the image converging layer 2 formed of the d transparent substrate 1. Alternatively, for example as shown in FIG. 2, it comprises a transparent substrate 1; an image transforming layer 2 formed on the transparent substrate 1, comprising a transmission type Fourier transform hologram region "a" and a non hologram region b; and a pressure-sensitive adhesive layer 3 formed on the non hologram region "b" of the; image transforming layer 2.

According to this embodiment, since the pressure-sensitive adhesive layer is formed, the hologram observation sheet can be bonded to for example a glass window so that the hologram observation sheet can be used for an advertising medium to be attached on a window pane, or the like of a vehicle for the public transportation such as a train and a bus, a decoration member to be attached on a window pane of an automobile or a house, or the like. Moreover, in the case an ultraviolet ray absorbing function, an infrared ray absorbing function, or the like is provided to the hologram observation sheet, it can be used also as various kinds of filters.

Here, in this embodiment, since the pressure-sensitive adhesive layer is formed on the surface on the side opposite to the side with the image transforming layer formed, or in the non hologram region of the image transforming layer, the refractive index difference of the light beam in the transmission type Fourier transform hologram region of the image transforming layer can remain without the refractive index difference change so that a hologram observation sheet capable of preferably observing an optical image obtained by the transmission type Flourier transform hologram region can be provided.

Moreover, according to this embodiment, since the transmission type Fourier transform hologram region is formed in the image transforming layer, a hologram observation sheet can be produced efficiently without the need of additionally attaching or sandwiching a member having the function of a transmission type Fourier transform hologram, and thus it is advantageous.

Hereinafter, the hologram observation sheet of this embodiment will be explained in detail for each member.

1. Pressure-sensitive Adhesive Layer

First, the pressure-sensitive adhesive layer used in this embodiment will be explained. The pressure-sensitive adhesive layer used in this embodiment is not particularly limited as long as it is formed on the surface on the side opposite to the side with the image transforming layer of the transparent substrate to be described later formed, or in the non hologram region without the function of transforming a light beam incident from the point light source of the image transforming layer to a desired optical image, and it is capable of being bonded with the member to be bonded, which is to be attached with the hologram observation sheet of this embodiment. The bonding property of the pressure-sensitive adhesive layer is selected optionally according to the kind and the application of the hologram observation sheet.

Here, the pressure-sensitive adhesive layer may be formed in the entire surface of the transparent substrate or the non hologram region, or it may be formed as a pattern only in a part of the transparent substrate or the non hologram region. The shape and the range of the region for forming the pressure-sensitive adhesive layer can be selected optionally according to the kind, the application, or the like of the hologram observation sheet.

Moreover, as the pressure-sensitive adhesive layer used in this embodiment, one having a lower haze is preferable. Specifically, those having a haze value in a range of 0.01% to 5% are preferable, those having a haze value in a range of 0.01% to 3% are more preferable, and those having a haze value in a range of 0.01% to 1.5% are particularly preferable. Thereby, even in the case the above-mentioned pressure-sensitive adhesive layer is formed on the entire surface of the transparent substrate, the optical image obtained by the transmission type Fourier transform hologram region of the image transforming layer can easily be observed. As the above-mentioned haze value, a value measured based on the JIS K7105 is used. Moreover, in the case the above-mentioned pressure-sensitive adhesive layer is formed on the entire surface of the transparent substrate, it is preferable that the transparency of the above-mentioned pressure-sensitive adhesive layer is high. Specifically, an 80% or more transmittance in the visible light region is preferable, and a 90% or more transmittance is further preferable. Thereby, the optical image obtained by the transmission type Fourier transform hologram region of the image transforming layer can more easily be observed. The transmittance of the pressure-sensitive adhesive layer can be measured by the JIS K7361-1 (testing method for the total light transmittance of plastic-transparent materials).

Moreover, in this embodiment, the pressure-sensitive adhesive layer may be an adhesive layer having the sticky property, or it may be a re-peelable adhesive layer having the both characteristics of the adhesive property and the re-peelable property.

In the case the above-mentioned pressure-sensitive adhesive layer is an adhesive layer, the hologram observation sheet can be attached firmly to a desired member by the pressure-sensitive adhesive force. Thereby, the hologram observation sheet can hardly be peeled off from the member to be bonded.

Moreover, in the case the pressure-sensitive adhesive layer is a re-peelable adhesive layer, the hologram observation sheet can be attached to a desired member by adhering the re-peelable adhesive layer and a member to be bonded without introduction of the air therebetween. According to the re-peelable adhesive layer, adhesion and peel-off can easily be carried out repeatedly without leaving the trace of an adhesive, or the like to the member to be bonded so that damage to the member to be bonded can be prevented. Such a hologram observation sheet having the re-peelable adhesive layer is advantageous in the case of the temporary use as an advertising medium, a decoration member, or the like at the time of an event or an activity so that it can correspond to a wide range of applications, and thus it is advantageous.

Moreover, the pressure-sensitive adhesive layer of this embodiment may include an ultraviolet absorber or an infrared absorber as needed. In the case an ultraviolet absorber or an infrared absorber is included in the pressure-sensitive adhesive layer, the hologram observation sheet can be used for example as an ultraviolet ray absorbing filter or a heat ray cut filter, and thus it is advantageous.

The ultraviolet absorber used for the pressure-sensitive adhesive layer is not particularly limited as long as it can absorb a light beam in the ultraviolet range. Specifically, a benzotriazol based ultraviolet absorber, a triadine based ultraviolet absorber, a benzophenone based ultraviolet absorber, a benzoate based ultraviolet absorber, a liquid ultraviolet absorber, a polymer type ultraviolet absorber, an anion based water soluble polymer ultraviolet absorber, a cation based water soluble polymer ultraviolet absorber, a nonion based water soluble polymer ultraviolet absorber, or the like can be presented. These can be used by one kind or as a mixture of two or more kinds. Among the above-mentioned examples, in particular, it is preferable to use a benzotriazol based, cyclic iminoester based ultraviolet absorber from the viewpoint of the endurance. Moreover, in the case two or more kinds of the ultraviolet absorbers are used in combination, since the ultraviolet rays of different wavelength can be absorbed at the same time, the ultraviolet absorbing effect can further be improved. The addition amount of the above-mentioned ultraviolet absorber can be selected optionally according to the kind, the application, or the like of the hologram observation sheet of this embodiment, it is contained in general in the solid component of the pressure-sensitive adhesive layer by about 0.1 to 20% by mass, more preferably by about 0.5 to 15% by mass. In the case it is less than the above-mentioned amount, the ultraviolet absorbing effect is poor, and furthermore, in the case it is more than the above-mentioned, the pressure-sensitive adhesive layer may be yellowed or the film forming property of the pressure-sensitive adhesive layer may be lowered.

The kind, or the like of the infrared absorber used for the pressure-sensitive adhesive layer is not particularly limited as long as it is a material for absorbing a light beam in the infrared range. As such an infrared absorber, for example, an inorganic infrared absorber such as a tin oxide, an indium oxide, a magnesium oxide, a titanium oxide, a chromium oxide, a zirconium oxide, a nickel oxide, an aluminum oxide, a zinc oxide, an iron oxide, an antimony oxide, a lead oxide and bismuth oxide; an organic infrared absorber such as a cyanine based compound, a phthalocyanine based compound, a naphthalocyanine based compound, a naphthoquinone based compound, an anthraquinone based compound, an aluminum based compound, a pyrririum based compound, a ceririum based compound, a squaririum compound, diimoniums, copper complexes, nickel complexes and dithiol based complexes can be presented; and these can be used by one kind or as a mixture of two or more kinds.

The amount of the above-mentioned infrared absorber can be selected optionally according to the infrared absorbing ability required to the bonding agent. It is included in the solid component of the pressure-sensitive adhesive layer in general by about 0.1 to 20% by mass, and more preferably by about 0.5 to 15% by mass.

Here, as mentioned above, in the case the pressure-sensitive adhesive layer is an adhesive layer, as a resin used for the formation of the adhesive layer, for example, an acrylic based resin, an ester based resin, a urethane based resin, an ethylene vinyl acetate based resin, a latex based resin, an epoxy based resin, a polyurethane ester based resin, or a fluorine based resin such as a vinylidene fluoride based resin (PVDF) and a vinyl fluoride based resin (PVF), or a polyimide based resin such as a polyimide, a polyamide imide and a polyether imide can be presented. In particular, it is preferably an acrylic based resin, a urethane based resin, an ethylene vinyl acetate based resin, or a latex based resin.

Moreover, as mentioned above, in the case the pressure-sensitive adhesive layer is a re-peelable adhesive layer, as the resin used for the formation of the re-peelable adhesive layer, an acrylic based resin, an ester acrylate resin, a copolymer thereof, a styrene-butadiene copolymer, a natural rubber, a casein, a gelatin, a rosin ester, a terpene resin, a phenol resin, a styrene resin, a coumarone-indene resin, a polyvinyl ether, a silicon resin, or the like can be presented. In particular, an acrylic based resin and a silicone resin are preferable because the acrylic based resin allows bonding even in the case slight concavo-convex is present on the surface to be bonded of the member, and furthermore, the silicone resin hardly has the bonding strength decline even in the case of repeatedly carrying out the adhesion and the peel-off.

Moreover, the peeling strength of the re-peelable adhesive layer formed using the above-mentioned resin is preferably in a range of 10 g/25 mm to 1,000 g/25 mm with respect to the member to be bonded, and it is more preferably in a range of 50 g/25 mm to 500 g/25 mm. In the case the peeling strength is less than the above-mentioned range, the hologram observation sheet can easily be peeled off from the member to be bonded by the external force. Moreover, in the case the peeling strength is more than the above-mentioned range, at the time of peeling off the hologram observation sheet from the member to be bonded, a part of the re-peelable adhesive layer may remain on the member to be bonded without being peeled off.

Moreover, as the method for forming the pressure-sensitive adhesive layer, a method of producing a pressure-sensitive adhesive layer forming coating solution by dissolving the above-mentioned resin as needed with an additive such as the above-mentioned ultraviolet absorber, infrared absorber, stickiness providing agent or stickiness adjusting agent in an organic solvent, and applying the pressure-sensitive adhesive layer forming coating solution by various kinds of coating methods such as a Mayer bar, gravure coating, gravure reverse coating, kiss reverse coating, three roll reverse coating, slit reverse die coating, comma coating, or knife coating can be used. Moreover, at the time, although the pressure-sensitive adhesive layer forming coating solution may be applied directly onto the transparent substrate or the image transforming layer, for example, after applying the same on the peelable layer once and drying, the pressure-sensitive adhesive layer may be transferred onto the transparent substrate or the image transforming layer. The thickness of the pressure-sensitive adhesive layer can be selected optionally according to the kind, the application, or the like of the hologram observation sheet. It is in general about 1 to 500 μm, more preferably about 5 to 50 μm.

2. Image Transforming Layer

Next, the image transforming layer used in this embodiment will be explained. The image transforming layer used in this embodiment formed on the transparent substrate to be described later, comprises: a transmission type Fourier transform hologram region having the function of transforming a light beam incident from a point light source to a desired optical image, and a non hologram region other than the transmission type Fourier transform hologram region and without the above-mentioned function. The shape, the range, or the like of the transmission type Fourier transform hologram region can be selected optionally according to the kind, the application, or the like of the hologram observation sheet.

Figure 3A:
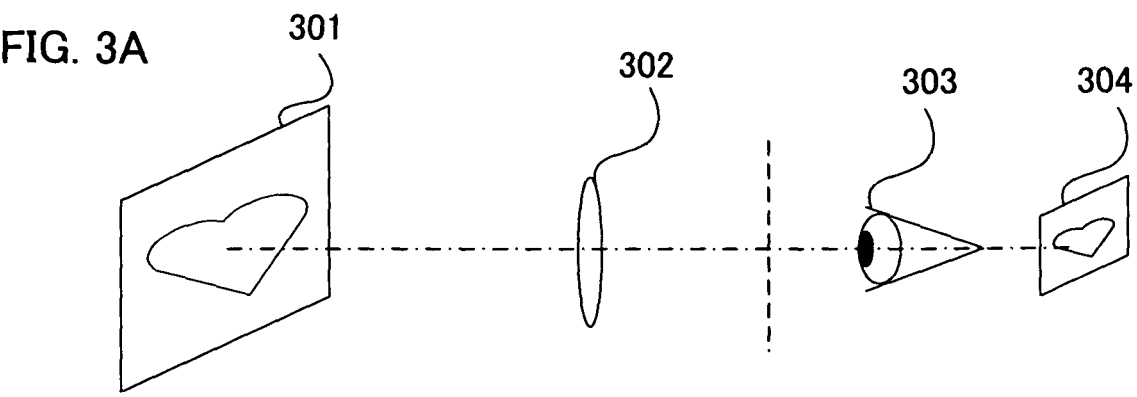
FIGS. 3A and 3B are schematic diagrams for explaining the function of a transmission type Fourier transform hologram region.
Figure 3B:
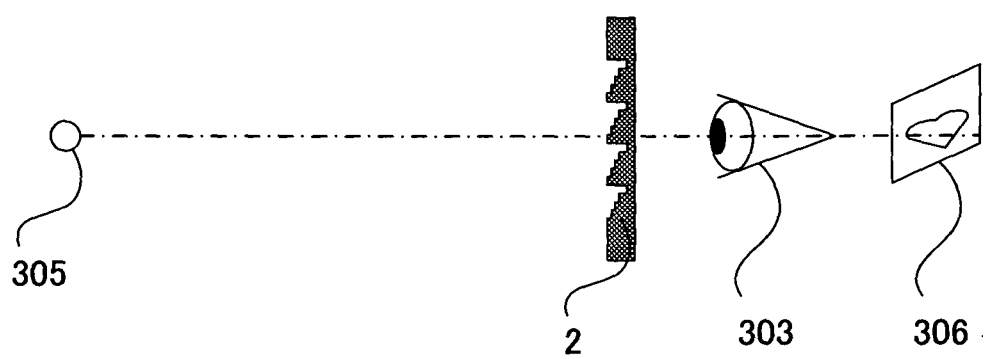

The function of the above-mentioned transmission type Fourier transform hologram region will be explained with reference to FIGS. 3A and 3B. FIG. 3A is a schematic diagram for explaining the case of visually observing an image through an ordinary lens. FIG. 3B is a schematic diagram for explaining the case of visually observing an image through the Fourier transform lens in the transmission type Fourier transform hologram region of the image transforming layer in this embodiment. As shown in FIG. 3A, by the observation of a desired image 301 with the human eyes 303 via a lens 302, an observation image 304 is observed as a similar figure of the image 301.

On the other hand, as shown in FIG. 3B, by the visual observation of a point light source 305 by the human eyes 303 through the transmission type Fourier transform hologram region of the image transforming layer 2, an optical image 306 according to the data recorded in the transmission type Fourier transform hologram region of the image transforming layer 2 is observed. For example, if a concavo-convex shape for reproducing a heart image, or the like is provided to the transmission type Fourier transform hologram region of the image transforming layer 2 as shown in FIG. 3B, by the visual observation of the point light source 305 through the image transforming layer 2, a heart optical image 306 can be recognized visually. Accordingly, the transmission type Fourier transform hologram region of the image transforming layer in this embodiment has the function of transforming a light beam incident from the point light source into a desired optical image.

The wavelength of the point light source for realizing the function of transforming a light beam incident from a point light source into a desired optical image of the transmission type Fourier transform hologram region of the image transforming layer in this embodiment is not particularly limited, and a desired wavelength can be dealt with. Moreover, the wavelength of the point light source is not limited to a single color light beam of one wavelength, but it may be a light beam including multiple wavelengths, or furthermore, it may be a white light beam.

Here, the kind of the image transforming layer is not particularly limited as long as a transmission type Fourier transform hologram region having the function of transforming a light beam incident from the point light source into a desired optical image is formed. For example, it may be a surface phase type diffractive-optical element layer having a concavo-convex structure in the transmission type Fourier transform hologram region surface, or an internal phase type diffractive-optical element layer having a refractive index distribution inside the image transforming layer in the transmission type Fourier transform hologram region. Furthermore, it may be an amplitude type diffractive-optical element layer having a transmittance distribution in the transmission type Fourier transform hologram region. Hereinafter, each case will be explained independently.

(Surface Phase Type Diffractive Optical Element Layer)

In the case the above-mentioned image transforming layer is a surface phase type diffractive optical element layer, concavo-convex is formed in the surface of the above-mentioned transmission type Fourier transform hologram region of the image transforming layer. In this embodiment, the image transforming layer may either be transparent or it may be colored.

The method for forming such an image transforming layer may for example as the following method. First, the data of an image to be displayed in the transmission type Fourier transform hologram region are processed to be Fourier transform data by the computer, and the Fourier transform data are binarized, quatrized, or the like. Furthermore, by transforming the data to rectangular data for the electron beam graphic, and drawing the rectangular data on the resist surface applied on such as a glass plate by an electron beam graphic device to be used for the graphic of a semiconductor circuit mask, or the like, an original master is produced. At the time, the portion to be the above-mentioned non hologram region is provided as a flat plate. Thereafter, an image transforming layer can be formed by forming a layer with the concavo-convex of the above-mentioned original master copied by for example a 2P method (Photo Polymerization method), an injection molding method, a sol gel process, a hard emboss method, a soft emboss method, a semi dry emboss method or various kinds of nano imprint methods. In this embodiment, in particular, it is particularly preferable to use the 2P method among the above-mentioned because the image transforming layer can be formed efficiently.

The formation of the image transforming layer by the 2P method is carried out by for example dropping an ionizing radiation curable resin composition onto the above-mentioned original master, and placing a transparent substrate onto the ionizing radiation curable resin composition so as to be pressed. Then, after curing the ionizing radiation curable resin composition by directing an ionizing radiation such as an ultraviolet ray from the original master side or from the transparent substrate side, the ionizing radiation curable resin composition and the transparent substrate are peeled off from the original master side so as to carry out the process.

As the material for forming the image transforming layer, various kinds of resin materials such as a thermosetting resin, a thermoplastic resin and an ionizing radiation cure resin used conventionally as a material for a relief type hologram forming layer can be used, and thus it is not particularly limited.

As the thermosetting resin, for example, an unsaturated polyester resin, an acrylic modified urethane resin, an epoxy modified acrylic resin, an epoxy modified unsaturated polyester resin, an alkyd resin, or a phenol resin can be presented. Moreover, as the thermoplastic resin, for example, an ester acrylate resin, an amide acrylate resin, a nitro cellulose resin or a polystyrene resin can be presented.

These resins may be a single polymer or a copolymer made of two or more kinds of constituent components. Moreover, these resins may be used alone or as a combination of two or more kinds. These resins may optionally select and contain various kinds of isocyanate compounds; a metal soap such as a cobalt naphtheate and a zinc naphtheate; an organic peroxide such as a benzoyl peroxide, and a methyl ethyl ketone peroxide; and a heat or ultraviolet ray curing agent such as a benzophenone, an acetophenone, an anthraquinone, a naphthoquinone, an azobis isobutylonitrile, and a diphenyl sulfide.

As the ionizing radiation cure resin, for example, an epoxy modified acrylate resin, an urethane modified acrylate resin, or an acrylic modified polyester can be presented. Among these examples, an urethane modified acrylate resin is particularly preferred, and an urethane modified acrylic based resin represented by the below-mentioned formula is particularly preferable.

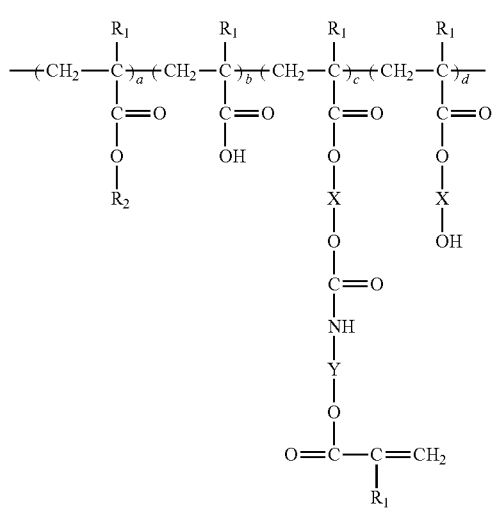

(wherein 5 $R^1$ represent each independently a hydrogen atom or a methyl group, $R^2$ represents a hydrocarbon group having $C_1$ to $C_{16}$, and X and Y respectively represents a straight chain or branched alkylene group. In the case (a+b+c+d) is 100, a is an integer of 20 to 90, b is 0 to 50, c is 10 to 80 and d is 0 to 20.)

The urethane modified acrylic based resin represented by the above-mentioned formula is for example, as a preferable example, an acrylic copolymer obtained by copolymerizing 20 to 90 moles of a methyl methacrylate, 0 to 50 moles of a methacrylic acid and 10 to 80 moles of a 2-hydroxy ethyl methacrylate, and a resin obtained by reacting a hydroxyl group present in the copolymer with a methacryloyloxy ethyl isocyanate (2-isocyanate ethyl methacrylate). Therefore, the methacryloyloxy ethyl isocyanate needs not be reacted with the all hydroxyl groups present in the copolymer, and at least 10 mole % or more, preferably 50 mole % or more of the 2-hydroxy ethyl methacrylate unit in the copolymer may be reacted with the methacryloyloxy ethyl isocyanate. Instead of, or in combination with the 2-hydroxy ethyl methacrylate, a monomer having a hydroxyl group such as an N-methylol acrylic amide, an N-methylol methacrylic amide, a 2-hydroxy ethylacrylate, a 2-hydroxyethylmethacrylate, a 2-hydroxy propyl acrylate, a 2-hydroxy propyl methacrylate, a 4-hydroxy butyl acrylate, and a 4-hydroxy butyl methacrylate can be used as well.

As to the urethane modified acrylic based resin represented with the above-mentioned formula, by dissolving the copolymer by a solvent capable of dissolving the same, such as a toluene, a ketone, a cellosolve acetate and a dimethyl sulfoxide and dropping and reacting with a methacryloyloxy isocyanate while agitating the solution, the isocyanate group is reacted with the hydroxyl group of the acrylic based resin so as to generate an urethane bond so that a methacryloyl group can be introduced into the resin via the urethane bond. The use amount of the methacryloyloxy ethyl isocyanate used at the time is an amount to have an isocyanate group in a range of 0.1 to 5 moles based on 1 mole of a hydroxyl group by the ratio of the hydroxyl group of the acrylic based resin and the isocyanate group, and preferably 0.5 to 3 moles. In the case of using the methacryloyloxy ethyl isocyanate more than equivalent to the hydroxyl group in the above-mentioned resin, the methacryloyloxy ethyl isocyanate may generate a —CONH—CH$_2$CH$_2$— link by the reaction also with a carboxyl group in the resin.

In the example mentioned above, the all $R^1$ and $R^2$ are each a methyl group and X and Y are each an ethylene group in the above-mentioned formula, however, the present invention is not limited thereto. The 5 $R^1$ may be each independently a hydrogen atom or a methyl group. Furthermore, as the specific examples of $R^2$, for example, a methyl group, an ethyl group, an n- or iso-propyl group, an n-, iso- or tert-butyl group, a substituted or unsubstituted phenyl group, or a substituted or unsubstituted benzyl group can be presented. As the specific examples of X and Y, an ethylene group, a propylene group, a diethylene group, or a dipropylene group can be presented. The total molecular weight of the urethane modified acrylic based resin obtained accordingly is 10,000 to 200,000 by the standard polystyrene based weight average molecular weight measured by the GPC, and it is further preferably 20,000 to 40,000.

At the time of curing the ionizing radiation cure resin as mentioned above, for the purpose of adjusting the cross linking structure, the viscosity, or the like, together with the monomer, a monofunctional or polyfunctional monomer, an oligomer, or the like as mentioned below can be used in combination.

As the monofunctional monomer, for example, a mono (meth)acrylate such as a tetrahydrofulfuryl (meth)acrylate, a hydroxyl ethyl (meth)acrylate, a vinyl pyrrolidone, a (meth)acryloyloxy ethyl succinate, and a (meth)acryloyloxy ethyl phthalate can be presented. As a bifunctional or more monomer, according to the skeleton structure classification, a polyol (meth)acrylate (for example, an epoxy modified polyol (meth)acrylate, or a lactone modified polyol (meth)acrylate), a polyester (meth)acrylate, an epoxy (meth)acrylate, an urethane (meth)acrylate, and additionally, a poly (meth)acrylate having a skeleton of the polybutadiene based, the isocyanuric acid based, the hidantoin based, the melamine based, the phosphoric acid based, the imide based, the phosphazene based, or the like can be presented. Various ultraviolet ray or electron beam curing type monomers, oligomers and polymers can be utilized.

Further specifically, as the bifunctional monomers and oligomers, for example, a polyethylene glycol di(meth)acrylate, a polypropyleneglycol di(meth)acrylate, a neopentyl glycol di(meth)acrylate, or a 1,6-hexane diol di(meth)acrylate can be presented. Moreover, as the trifunctional monomers, oligomers and polymers, for example, a trimethylol propane tri(meth)acrylate, a pentaerythritol tri(meth)acrylate, or an aliphatic tri(meth)acrylate can be presented. Moreover, as the tetrafunctional monomers and oligomers, for example, a pentaerythritol tetra(meth)acrylate, a ditrimethylol propane tetra (meth)acrylate, an aliphatic tetra(meth)acrylate, or the like can be presented. Moreover, as the pentafunctional or more monomers and oligomers, for example, a dipentaerythritol penta(meth)acrylate, or a dipentaerythritol hexa(meth)acrylate can be presented, and furthermore, a (meth)acrylate having a polyester skeleton, an urethane skeleton or a phosphazene skeleton, or the like can be presented. Although the functional group number is not particularly limited, if the functional group number is less than 3, the heat resistance tends to be lower, and furthermore, when it is over 20, the flexibility tends to be lowered, and thus those having a 3 to 20 functional group number are particularly preferable.

The use amount of the monofunctional or polyfunctional monomers and oligomers as mentioned above may be determined optionally according to the production method for an image transforming layer, or the like. It is in general preferably 50 parts by weight or less with respect to 100 parts by weight of the ionizing radiation cure resin, and it is particularly preferably in a range of 0.5 part by weight to 20 parts by weight.

Furthermore, as needed, to the hologram layer in the present invention, additives such as a photo polymerization initiating agent, a polymerization inhibiting agent, a deterioration preventing agent, a plasticizing agent, a lubricating agent, a coloring agent such as a dye and a pigment, a filling agent such as an extender pigment and a resin for the amount increase or preventing blocking, a surfactant, an antifoaming agent, a leveling agent, or a thixotropic property providing agent can be added optionally.

(Internal Phase Type Diffractive-Optical Element Layer)

In the case the above-mentioned image transforming layer is an internal phase type diffractive-optical element layer, the above-mentioned transmission type Fourier transform hologram region of the image transforming layer has the interference fringes of an object beam and a reference beam recorded so that an optical image can be observed by the refractive index difference between the above-mentioned interference fringes and the components formed between the interference fringes.

As the material for forming such an image transforming layer, a photosensitive composition can be used. In general, a photo sensitive composition such as a silver salt material, a dichromated gelatin emulsion, a photo polymerizable resin, and a photo cross-linkable resin can be used. In this embodiment, in terms of the production efficiency, in particular, a photo sensitive composition containing the following (i), (ii) materials can be used preferably. Each of the photo sensitive compositions will be explained hereafter.

(i) Photo Sensitive Composition Containing a Binder Resin, a Photo Polymerizable Compound, a Photo Polymerization Initiating Agent and a Sensitizing Pigment First, a photosensitive composition containing a binder resin, a photo polymerizable compound, a photo polymerization initiating agent and a sensitizing pigment will be explained. As a binder resin used for such a photosensitive composition, a polyester (meth) acrylate, or a partially hydrolyzed product thereof, a polyvinyl acetate or a hydrolyzed product thereof, a copolymer having at least one of the copolymerizable monomer groups such as an acrylic acid and an ester acrylate, or a mixture thereof; a polyvinyl acetal as a partially acetarized product of a polyisoprene, a polybutadiene, a polychloroprene, or a polyvinyl alcohol; a polyvinyl butyral, a polyvinyl acetate, a vinyl chloride-vinyl acetate copolymer, a mixture thereof, or the like, can be presented. Here, at the time of forming the image transforming layer, a process of moving the monomers by heating is provided for stabilizing the hologram recorded in the above-mentioned transmission type Fourier transform hologram region. Therefore, it is preferable that the binder resin has a relatively low glass transition temperature so as to facilitate the monomer movement.

Moreover, as a photopolymerizable compound contained in the photosensitive composition, a photo polymerizable and photo cross-linkable monomer, oligomer, prepolymer, and a mixture thereof, having at least one ethylenically unsaturated bond in one molecule can be used as it will be described later. For example, an unsaturated carboxylic acid and a salt thereof, an ester of an unsaturated carboxylic acid and an aliphatic polyhydric alcohol compound, or an amide compound of an unsaturated carboxylic acid and an aliphatic polyvaleic amine compound can be presented.

As the specific examples of a monomer of an unsaturated carboxylic acid, an acrylic acid, a methacrylic acid, a itaconic acid, a crotonic acid, an isocrotonic acid, or a maleic acid can be presented. Moreover, as to the specific examples of an ester of an aliphatic polyhydric alcohol compound and an unsaturated carboxylic acid, as an ester acrylate, an ethylene glycol diacrylate, a triethylene glycol diacrylate, a 1,3-butane diol diacrylate, a tetramethylene glycol diacrylate, a propylene glycol diacrylate, a neopentyl glycol diacrylate, a trimethylol propane triacrylate, a trimethylol propane tri(acryloyloxy propyl) ether, or a trimethylol ethane triacrylate can be presented.

As an ester methacrylate, a tetramethylene glycol dimethacrylate, a triethylene glycol dimethacrylate, a neopentyl glycol dimethacrylate, a trimethylol propane trimethacrylate, a trimethylol ethane trimethacrylate, or the like can be presented. As an ester itaconate, an ethylene glycol diitaconate, a propylene glycol diitaconate, a 1,3-butane diol diitaconate, or the like can be presented. As an ester crotonate, an ethylene glycol dicrotonate, a tetramethylene glycol dicrotonate, a peentaerythritol dicrotonate, a sorbitol tetracrotonate, or the like can be presented. As an ester isocrotonate, an ethylene glycol diisocrotonate, a pentaerythritol diisocrotonate, a sorbitol tetraisocrotonate, or the like can be presented. As an ester maleate, an ethylene glycol dimaleate, a triethylene glycol dimaleate, a pentaerythritol dimaleate, a sorbitol tetramaleate, or the like can be presented.

As a halogenated unsaturated carboxylic acid, a 2,2,3,3-tetrafluoropropyl acrylate, a 1H, 1H, 2H, 2H-heptadecafluolodecyl acrylate, a 2,2,3,3-tetrafluoropropyl methacrylate, or the like can be presented. Moreover, as the specific examples of an amide monomer of an unsaturated carboxylic acid and an aliphatic polyvaleic amine compound, a methylene bisacrylic amide, a methylene bismethacrylic amide, a 1,6-hexamethylene bisacrylic amide, or a 1,6-hexamethylene bismethacrylic amide can be presented.

Moreover, as the photo polymerization initiating agent to be used, a 1,3-di(t-butyl dioxycarbonyl) benzophenone, a 3,3',4,4'-tetraxy(t-butyl dioxycarbonyl) benzophenone, a N-phenyl glycine, a 2,4,6-tris(trichloromethyl)-S-triadine, a 3-phenyl-5-isooxazolone, a 2-mercaptobenzimidazol, and furthermore, imidazol dimmers, or the like can be presented. From the viewpoint of the stabilization of the recorded hologram, it is preferable that the photo polymerization initiating agent has the decomposition process after recording the hologram. For example, since the organic peroxide based ones can be decomposed easily by the ultraviolet ray irradiation, they are preferable.

Moreover, as the sensitizing pigment, a thiopyririum salt based pigment having an absorbed light in 350 to 600 nm, a merocyanine based pigment, a quinoline based pigment, a styryl quinoline based pigment, a ketocoumarine based pigment, a thioxantene based pigment, a xantene based pigment, an oxonol based pigment, a cyanine dye, a rhodamine dye, a thiopyririum salt based pigment, a pyririum ion based pigment, a diphenyl iodonium ion based pigment, or the like can be presented. Furthermore, a sensitizing pigment having an absorbed light in a wavelength range of 350 nm or less, or 600 nm or more can also be used.

The composition ratio of the above-mentioned binder resin, the photo polymerizable compound, the photo polymerization initiating agent and the sensitizing pigment is as follows. The photo polymerizable compound is used by the ratio with respect to 100 parts by mass of the binder resin, by 10 parts by mass to 1,000 parts by mass, preferably by 10 parts by mass to 100 parts by mass. The photo polymerization initiating agent is used by the ratio with respect to 100 parts by mass of the binder resin, by 1 part by mass to 10 parts by mass, preferably by 5 parts by mass to 10 parts by mass. The sensitizing pigment is used by the ratio with respect to 100 parts by mass of the binder resin, by 0.01 part by mass to 1 part by mass, preferably by 0.01 part by mass to 0.5 part by mass. Additionally, as the components of the photosensitive composition, for example, a plasticizing agent, a glycerol, a diethylene glycol, a triethylene glycol, and various kinds of non-ionic surfactants, anionic surfactants, cationic surfactants, or the like can be presented.

Moreover, as the above-mentioned photosensitive composition, in general, a methyl ethyl ketone, a cyclohexanone, a xylene, a tetrahydrofuran, an ethyl cellosolve, a methyl cellosolve acetate, an ethyl acetate, an isopropanol, or the like alone or a solvent mixture thereof can be used as a coating solution with the solid component of 10% to 25%. In the case the above-mentioned transparent substrate is a leaf (sheet-like), the above-mentioned image transforming layer is formed by the application with bar coating, spin coating, dipping, or the like, using the above-mentioned photosensitive composition in a diluted state. Moreover, in the case the transparent substrate is a lengthy roll, the image transforming layer can be formed by applying the above-mentioned photosensitive composition in a diluted state by such as gravure coating, roll coating, die coating, or comma coating, drying and/or as needed curing. The thickness of the image transforming layer accordingly obtained is 0.1 μm to 50 μm, preferably 5 μm to 20 μm, and as needed, a protection film may be attached thereto. As the protection film, a resin film having a high transparency and a high smoothness of about a 10 μm to 100 μm, such as a polyethylene terephthalate film, a polypropylene film and a polyvinyl chloride film can be attached by rubber roller, or the like. Moreover, as the photosensitive composition, for example, a commercially available product "OmniDex 801", of Du Pont Kabushiki Kaisha can also be used.

In the transmission type Fourier transform hologram region of such an image transforming layer, using two light flux laser beams, interference fringes are recorded. As the above-mentioned laser beams, for example, a 633 nm wavelength beam in a helium neon laser as a visible light amount range, 514.5 nm, 488 nm, 457.9 nm wavelength beams in an argon laser, 647.1 nm, 568.2 nm, 520.8 nm wavelength in a krypton laser, and furthermore, 337.5 nm, 350.7 nm, 356.4 nm wavelength beams in a krypton laser (1.5 W), 351.1 nm, 368.8 nm wavelength beams in an argon laser (40 mW), 332.4 nm wavelength beam in a neon laser (50 mW), or 325.0 nm wavelength beam in a cadmium laser (15 mW) can be used.

By taking out one of the wavelengths for using a wavelength capable of exciting the photo polymerization initiating agent for recording interference fringes; recording interference fringes of an object beam and a reference beam; or by adhering an original master of a hologram to the image transforming layer after peeling off the protection film, inputting a laser from the image transforming layer side for recording interference fringes of a reflected light beam from the original master and an incident light beam, hologram information is provided.

Thereafter, after a process of decomposing the photo polymerization initiating agent by the ultraviolet irradiation from a light source such as a ultrahigh pressure mercury lamp, a high pressure mercury lamp, a carbon arc, a xenon arc, and a metal halide lamp by 0.1 to 10,000 mJ/cm$^2$, preferably by 10 to 1,000 mJ/cm$^2$, and a heat treatment process of diffusing and moving the photo polymerizable compound by heating for example at 120° C. for 120 minutes, or the like, a stable image transforming layer can be provided.

(ii) Sensitizing Composition Containing a Cationically Polymerizable Compound, a Radically Polymerizable Compound, a Photo Radical Polymerization Initiating Agent for Polymerizing a Radically Polymerizable Compound by the Sensitization by a Light Beam of a Specific Wavelength, and a Photo Cation Polymerization Initiating Agent for Polymerizing a Cationically Polymerizable Compound, Which has a Low Sensitizing Property With Respect to a Light Beam of a Specific Wavelength, and a Polymerizing Property with Respect to a Cationically Polymerizable Compound by the Sensitization by a Light Beam of Another Wavelength Next, a sensitizing composition containing a cationically polymerizable compound, a radically polymerizable compound, a photo radical polymerization initiating agent for polymerizing a radically polymerizable compound by the sensitization by a light beam of a specific wavelength, and a photo cation polymerization initiating agent for polymerizing a cationically polymerizable compound, which has a low sensitizing property with respect to a light beam of a specific wavelength, and a polymerizing property with respect to a cationically polymerizable compound by the sensitization by a light beam of another wavelength will be explained.

In the case the sensitizing composition is used, by directing a light beam such as a laser beam for sensitizing the photo radical polymerization initiating agent after applying the sensitizing composition on the transparent substrate, and then directing a light beam of a wavelength other than that of the above-mentioned laser beam for sensitizing the photo cation polymerization initiating agent, an image transforming layer with the hologram recorded in the transmission type Fourier transform hologram region can be formed. Specifically, by the light irradiation of a laser beam, or the like (hereinafter, it is referred to as the first exposure), the radically polymerizable compound is polymerized. Thereafter, by the cation polymerization of the cationically polymerizable compound by a Bronsted acid or a Lewis acid generated by the decomposition of the photo cation polymerization initiating agent by the entire exposure to be carried out subsequently (hereinafter, it is referred to as the post exposure), the image transforming layer is formed.

As the above-mentioned cationically polymerizable compound, from the viewpoint that the polymerization of the radically polymerizable compound can be carried out preferably in a composition of a relatively low viscosity, one which is liquid at the room temperature can be used. As such a cationically polymerizable compound, a diglycerol diether, a pentaerythritol polydiglycidyl ether, a 1,4-bis(2,3-epoxy propoxy perfluoro isopropyl) cyclohexane, a sorbitol polyglycidyl ether, a 1,6-hexane diol glycidyl ether, a polyethylene glycol diglycidyl ether, a phenyl glycidyl ether, or the like can be presented.

Moreover, as the radically polymerizable compound, one having at least one ethylenically unsaturated double bond in a molecule is preferable. Moreover, the average refractive index of the radically polymerizable compound is preferably larger than the average refractive index of the above-mentioned cationically polymerizable compound, and it is more preferably larger by 0.02 or more because the hologram is formed by the refractive index difference between the radically polymerizable compound and the cationically polymerizable compound. Therefore, in the case the average refractive index difference is less than the above-mentioned value, the refractive index modulation is insufficient. The above-mentioned refractive index can be measured with a spectral ellipsometer. As the radically polymerizable compound, for example, an acrylic amide, a methacrylic amide, a styrene, a 2-bromo styrene, a phenyl acrylate, a 2-phenoxy ethyl acrylate, a 2,3-naphthalene dicarboxylic acid (acryloxy ethyl)

monoester, a methyl phenoxy ethyl acrylate, a nonyl phenoxy ethyl acrylate, or a β-acryloxy ethyl hydrogen phthalate can be presented.

The photo radical polymerization initiating agent may be an initiating agent for producing an active radical by the first exposure for the hologram production and polymerizing the radically polymerizable compound with the active radical, and furthermore, a combination of a sensitizing agent as a component for generally absorbing a light beam and an active radical generating compound or an acid generating compound may be used as well. As the sensitizing agent in the photo radical polymerization initiating agent, an organic compound such as a pigment is used in many cases for absorbing the visible laser beam, however, in the case of providing a colorless transparent hologram, a cyanine based pigment is preferable. Since the cyanine based pigment in general can easily be decomposed by a light beam, the pigment in the hologram is decomposed by leaving under an interior light beam or a sun ray for several hours to several days so as not to have the absorption in the visible range so that a colorless and transparent hologram can be obtained.

As the specific examples of the cyanine based pigment, an anhydro-3,3'-dicarboxy methyl-9-ethyl-2,2' thiacarbocyanine betain, an anhydro-3-carboxy methyl-3'9'-diethyl-2,2' thiacarbocyanine betain, a 3,3',9-triethyl-2,2'-thiacarbocyanine-iodine salt, a 3,9-diethyl-3'-carboxy methyl-2,2'-thiacarbocyanine-iodine salt, a 3,3',9-triethyl-2,2'-(4,5,4',5'-dibenzo) thiacarbocyanine-iodine salt, a 2-[3-(3-ethyl-2-benzothiazolidene)-1-propenyl]-6-[2-(3-ethyl-2-benzothiazolidene) ethylidene imino]-3-ethyl-1,3,5-thiadiazolium-iodine salt, a 2-[[3-allyl-4-oxo-5-(3-n-propyl-5,6-dimethyl-2-benzoth iazolilidene)-ethylidene-2-thiazolinylidene]methyl]3-ethyl-4,5-diphenyl thiazolinium-iodine salt, a 1,1',3,3,3',3'-hexamethyl-2,2'-indotricarbocyanine-iodine salt, a 3,3'-diethyl-2,2'-thiatricarbocyanine-perchlorate, an anhydro-1-ethyl-4-methoxy-3'-caroxy methyl-5'-chloro-2,2'-quinothiacyanine betain, or an anhydro-5,5'-diphenyl-9-ethyl-3,3'-disulfopropyl oxacarbocyanine hydroxide-triethyl amine salt can be presented. These can be used by one kind or as a combination of two or more kinds.

As the active radical generating compound to be used in combination with the cyanine based pigment, diaryl iodonium salts, or 2,4,6-substituted-1,3,5-triadines can be presented. In the case a high photosensitive property is required, the diaryl iodonium salts can be used particularly preferably. As the specific examples of the above-mentioned diaryl iodonium salts, a chloride, a bromide, a tetrafluoroborate, a hexafluorophosphate, a hexafluoroarcenate, a hexafluoroantimonate, a trifluoro methane sulfonate, a 9,10-dimethoxy anthracnene-2-sulfonate, or the like of a diphenyl iodonium, a 4,4'-dichlorodiphenyl iodonium, a 4,4'-dimethoxy diphenyl iodonium, a 4,4'-ditert butyl diphenyl iodonium, a 3,3'-dinitrodiphenyl iodonium, or the like can be presented. Moreover, as the specific examples of the 2,4,6-substituted-1,3,5-triadines, a 2-methyl-4,6-bis(trichloro methyl)-1,3,5-triadine, a 2,4,6-tris(trichloro methyl)-1,3,5-triadine, a 2-phenyl-4,6 bis (trichloro methyl)-1,3,5-triadine, 2,4-bis(trichloro methyl)-6-(p-methoxyphenylbinyl)-1,3,5-triadine, or a 2-(4'-methoxy-1'-naphthyl)-4,6-bis(trichloro methyl)1,3,5-triadine can be presented.

It is preferable that the above-mentioned photo cationic polymerization initiating agent is an initiating agent having a low photosensitive property with respect to the first exposure, and exposed by the post exposure with the light irradiation of a wavelength different from the first exposure so as to generate a Bronstead acid or a Lewis acid for polymerizing a cationically polymerizable compound, and one not polymerizing the cationically polymerizable compound during the first exposure is particularly preferable. As the photo cation polymerization initiating agent, for example, diaryl iodonium salts, triaryl sulfonium salts, or iron allen complexes can be presented. As the preferable diaryl iodonium salts, a tetrafluoroborate, a hexafluorophosphate, a hexafluoroarcenate, a hexafluoroantimonate of the iodonium presented for the above-mentioned photo radical polymerization initiating agent, or the like can be presented. As the preferable triaryl sulfonium salts, a triphenyl sulfonium, a 4-tert butyl triphenyl sulfonium, or the like can be presented.

For the photosensitive composition, as needed, a binder resin, a thermal polymerization inhibiting agent, a silane coupling agent, a plasticizing agent, a coloring agent, or the like may be used in combination. The binder resin is used in the case of improving the film forming property and the film thickness evenness of the image transforming layer before the hologram formation, or for stably presenting the interference fringes formed by the polymerization by the light irradiation such as a laser beam until the post exposure. As the binder resin, one having a good compatibility with the cationically polymerizable compound or the radically polymerizable compound may be used. For example, a polyethylene chlorate, a polymethyl methacrylate, a copolymer of a methyl methacrylate and another alkyl ester (meth)acrylate, a copolymer of a vinyl chloride and an acrylonitrile, or a polyvinyl acetate can be presented. The binder resin may have a reactivity such as a cationically polymerizable group in the side chain or the principal chain.

As to the composition ratio of the photosensitive composition, with respect to the total mass of the photosensitive composition, the cationically polymerizable compound is 2% by mass to 70% by mass, preferably 10% by mass to 50% by mass; the radically polymerizable compound is 30% by mass to 90% by mass, preferably 40% by mass to 70% by mass; the cation polymerization initiating agent is 0.3% by mass to 8% by mass, preferably 1% by mass to 5% by mass; and the radical polymerization initiating agent is 0.3% by mass to 8% by mass, preferably 1% by mass to 5% by mass. The above-mentioned photosensitive composition can be prepared by mixing the essential components and the optional components as they are or as needed after mixing with a ketone based solvent such as a methyl ethyl ketone, an ester based solvent such as an ethyl acetate, an aromatic solvent such as a toluene, a cellosolve based solvent such as a methyl cellosolve, an alcohol based solvent such as a methanol, an ether based solvent such as a tetrahydrofuran and a dioxane, a halogen based solvent such as a dichloromethane and a chloroform, or the like, using for example a high speed agitator in a cool and dark place.

The image transforming layer made of such a photosensitive composition can be formed by applying and drying the above-mentioned photosensitive composition by the same coating method as the (i) photosensitive composition. The application amount can be selected optionally. For example, the film thickness after drying may be 1 μm to 50 μm.

By polymerizing the radically polymerizable compound by directing for example a laser beam of a 300 to 1,200 nm wavelength to the image transforming layer accordingly produced, the interference fringes are recorded in the inside. At this stage, a diffracted light by the recorded interference fringes is obtained so as to form the hologram, however, in order to further polymerize the cationically polymerizable compound remaining unreacted, it is preferable to form the hologram by the entire surface irradiation of a light beam of a 200 nm to 700 nm wavelength for sensitizing the photocation polymerization initiating agent as the post exposure. By the heat or infrared ray process of the image transforming layer before the post process, the diffraction efficiency, the peak wavelength of the diffracted light, the half band width, or the like can also be changed.

(Amplitude Type Diffractive-Optical Element Layer)

In the case the above-mentioned image transforming layer is an amplitude type diffractive-optical element layer, the strength distribution of the brightness such as black and white can be recorded in the above-mentioned transmission type Fourier transform hologram region of the image transforming layer. According to such an image transforming layer, the image transforming layer is formed using a photosensitive material such as a silver salt photosensitive material, and the interference fringes of an object beam and a reference beam are exposed by a laser light beam in the portion for providing the transmission type Fourier transform hologram region of the image transforming layer. Thereafter, by carrying out the development and fixation, a hologram can be formed in the transmission type Fourier transform hologram region.

As the material to be used for such an image transforming layer, for example, a silver salt photograph photosensitive material such as a silver halide photograph photosensitive material, a gelatin processed by a bichromic acid, or a photosensitive material using a photosensitive resin can be presented. In this embodiment, among the above-mentioned examples, the silver salt photosensitive material is particularly preferable because an image transforming layer having a high sensitivity, a wide spectral sensitivity distribution and a high diffraction efficiency can be formed thereby.

3. Transparent Substrate

Next, a transparent substrate used in the present embodiment will be explained. The transparent substrate used in the present embodiment is not particularly limited as long as it can form the image transforming layer and has the light transmitting property capable of transmitting the optical image formed in the transmission type Fourier transform hologram region of the image transforming layer. In particular, it is preferable that the transparent substrate in the present embodiment has an 80% or more transmittance in the visible light region, and more preferably 90% or more. In the case the transmittance is low, the optical image obtained by the transmission type Fourier transform hologram region of the present embodiment may be disturbed. Here, the transmittance of the transparent substrate can be measured by the JIS K7361-1 (Determination of the total light transmittance of plastic-transparent materials).

Moreover, as the transparent substrate used in the present embodiment, those having a lower haze are preferable. Specifically, those having the haze value in a range of 0.01% to 5% are preferable; those in a range of 0.01% to 3% are more preferable; and those in a range of 0.01% to 1.5% are particularly preferable. Here, as the haze value, a value measured based on the JIS K7105 is used.

The material for providing the transparent substrate of the embodiment is not particularly limited as long as it has the above-mentioned characteristics. For example, a plastic resin film and a glass plate can be used. In the present embodiment, it is preferable to use a plastic resin film as the transparent substrate because the plastic resin film is lightweight and it has little risk of breakage unlike the case of a glass.

The resin for providing the above-mentioned plastic resin film is not particularly limited as long as it has a rigidity capable of supporting the above-mentioned image transforming layer. As such a plastic resin, for example, a polyethylene terephthalate, a polycarbonate, an acrylic resin, a cycloolefin resin, a polyester resin, a polystyrene resin, or an acrylic styrene resin can be presented. In particular, in terms of the birefringence, a polycarbonate is most preferable. The thickness thereof is about 0.05 to 5 mm, preferably 0.1 to 3 mm in terms of the handling property. Moreover, in this embodiment, in order to improve the adhesion property between the above-mentioned transparent substrate and the pressure-sensitive adhesive layer, for example, the corona process may be applied to the transparent substrate surface.

4. Hologram Observation Sheet

Next, the hologram observation sheet of this embodiment will be explained. The shape, or the like, of the hologram observation sheet of this embodiment is not particularly limited as long as it comprises the above-mentioned transparent substrate, image transforming layer and pressure-sensitive adhesive layer, and thus it can be selected optionally according to such as the kind of the hologram observation sheet or the application.

Moreover, in this embodiment, the layer configuration is not particularly limited as long as it has the above-mentioned layers. For example, a printing layer may be formed on the above-mentioned transparent substrate or the non hologram region of the above-mentioned image transforming layer. Moreover, a release substrate may be disposed on the above-mentioned pressure-sensitive adhesive layer. Furthermore, as needed, an ultraviolet ray absorbing layer, an infrared ray absorbing layer, a reflection preventing layer, or the like may be formed as needed on the above-mentioned transparent substrate or the non hologram region of the image transforming layer.

Moreover, a self supporting property substrate may be formed between the above-mentioned transparent substrate and the above-mentioned pressure-sensitive adhesive layer in the case the pressure-sensitive adhesive layer is formed on the surface on the side opposite to the side with the above-mentioned image transforming layer of the transparent substrate formed, or between the above-mentioned non hologram region and the pressure-sensitive adhesive layer in the case the pressure-sensitive adhesive layer is formed on the non hologram region of the image transforming layer.

In the case the above-mentioned printing layer is formed, for example, letter information, signs, marks, illustration, or characters can be printed on the hologram observation sheet so that the hologram observation sheet can be used for the wide applications such as the advertising application and the decoration member.

Such a printing layer is not particularly limited as long as it is a layer to be printed by various kinds of printing methods. For example, it may be a layer made of polycarbonates, polyesters, cellulose derivatives, a norbornen based resin, polyvinyl chlorides, polyvinyl acetates, an acrylic based resin, a urethane based resin, polypropylenes, polyethylenes, or styrenes. Moreover, as to the method for forming the printing layer, it may be same as a method for forming a common resin layer. Moreover, the printing method at the time of applying printing onto the printing layer in this embodiment is not particularly limited as long as it is a method capable of providing a desired design property to the printing layer. For example, a basic printing method such as a planographic printing, an intaglio printing, a letterpress printing and a screen printing, and an applied printing method thereof can be used. As the applied printing methods, a flexo printing, a resin letterpress printing, a gravure offset printing, a pad printing, an ink jet printing, a transfer printing using a transfer foil, a transfer printing using a thermal fusion or sublimation type ink ribbon, an electrostatic printing, or the like can be used. Moreover, as to the technique, an ultraviolet (UV) curing printing for curing the ink by an ultraviolet ray, a baking printing for curing the ink at a high temperature, a waterless offset printing without using wet water, or the like can be used.

Moreover, the printing information to be provided for the printing layer is not particularly limited, for example, letters, signs, marks, illustration, characters, company names, product names, sales points, or handling explanation can be presented.

Moreover, in the case the release substrate is disposed on the above-mentioned pressure-sensitive adhesive layer, the hologram observation sheet can be used by peeling off the release substrate and the pressure-sensitive adhesive layer immediately before attaching the hologram observation sheet with a desired member to be attached. Thereby, adhesion of foreign substances between the pressure-sensitive adhesive layer and the member to be bonded can be prevented.

The release substrate is not particularly limited as long as it can protect the pressure-sensitive adhesive layer and it can be easily peeled off from the pressure-sensitive adhesive layer. Such a release substrate can be a layer made of for example, a polyethylene terephthalate (PET), a polyethylene naphthalate (PEN), or a polyphenylene sulfide (PPS). The thickness of the release substrate can be selected optionally according to the kind of the hologram observation sheet, the application, or the like.

Moreover, it is preferable that the peeling process is applied to the surface of the above-mentioned release substrate on the side to be contacted with the pressure-sensitive adhesive layer for facilitating the peel off operation from the pressure-sensitive adhesive layer. As a process method, for example, a silicon process, or an alkyd process can be presented, however, it is not particularly limited.

Moreover, in the case the ultraviolet ray absorbing layer, the infrared ray absorbing layer, or the reflection preventing layer is formed on the above-mentioned transparent substrate or the non hologram region of the above-mentioned image transforming layer, the hologram observation sheet of this embodiment may be provided such as with the ultraviolet ray absorbing function, the infrared ray absorbing function, or the reflection preventing function so that the hologram observation sheet can be also used such as for various kinds of filters. The ultraviolet ray absorbing layer, the infrared ray absorbing layer, the reflection preventing layer, or the like may be same as those commonly used.

Moreover, in the case the above-mentioned self supporting property substrate is formed, a hologram observation sheet having a high self supporting property can be provided so that it can be easily bonded to a member to be bonded having such as a high surface flatness, and furthermore, the release substrate can easily peeled off from the hologram observation sheet.

The self supporting property substrate is not particularly limited as long as it has the self supporting property and the light transmitting property for transmitting the optical image obtained in the transmission type Fourier transform hologram region of the image transforming layer so that it can be for example same as the above-mentioned transparent substrate.

Moreover, it is preferable to provide a substrate pressure-sensitive adhesive layer between the above-mentioned self supporting property substrate and the transparent substrate in the case the self supporting property substrate is formed between the transparent substrate and the above-mentioned pressure-sensitive adhesive layer, or between the above-mentioned self supporting property substrate and the non hologram region in the case the self supporting property substrate is formed between the non hologram region and the pressure-sensitive adhesive layer. The substrate pressure-sensitive adhesive layer is not particularly limited as long as it can bond the self supporting property substrate and the transparent substrate or the non hologram region. Here, the substrate pressure-sensitive adhesive layer may either be formed on the entire surface of the self supporting property substrate or only in a part of the region of the self supporting property substrate in a pattern.

As the sticky agent used for the formation of the substrate pressure-sensitive adhesive layer, for example, an acrylic resin, an ester acrylate resin, a copolymer thereof, a styrene-butadiene copolymer, a natural rubber, a casein, a gelatin, a rosin ester, a terpene resin, a phenol based resin, a styrene based resin, a coumarone indene resin, a polyvinyl ether, or a silicone resin can be presented. Furthermore, the α-cyano acrylate based, silicone based, maleimide based, styrol based, polyolefin based, polyvinyl ether based adhesives, or the like can be presented.

Moreover, as the other sticky agents, in addition thereto, heat seal can be presented. For example, an ethylene-vinyl acetate copolymer resin, a polyamide resin, a polyester resin, a polyethylene resin, an ethylene-isobutyl acrylate copolymer resin, a butyral resin, a polyvinyl acetate and a copolymer resin thereof, a cellulose derivative, a polymethyl methacrylate resin, a polyvinyl ether resin, a polyurethane resin, a polycarbonate resin, a polypropylene resin, an epoxy resin, or a phenol resin can be presented. Alternatively, the thermoplastic elastomers or reactive hot melt type resins, or the like such as an SBS (styrene-butadiene-styrene block copolymer), an SIS (styrene-isoprene-styrene block copolymer), and an SEBS (styrene-ethylene-butylene-styrene block copolymer) may also be used.

The above-mentioned substrate pressure-sensitive adhesive layer is a layer for the purpose of bonding the self supporting property substrate and the transparent substrate or the non hologram resin. As the bonding method using the substrate pressure-sensitive adhesive layer, for example, a method of applying the above-mentioned sticky agent on one side or both sides of the surfaces to be bonded, and pressing them after as needed drying, or the like can be presented. At the time of pressing, as needed, a heating operation may be carried out. Moreover, a method of applying a sticky agent on the peeling surface of a surface peelable sheet called a separator, pressing the same on either bonding surface, peeling off the separator after pressing, and pressing the sticky agent surface revealed by the peel off on another bonding surface can also be used. Moreover, the thickness of the substrate pressure-sensitive adhesive layer can be selected optionally according to the kind of the hologram observation sheet, the application, or the like, however, in general, it is preferably 4 μm to 20 μm.

Moreover, the haze value and the transparency of the substrate pressure-sensitive adhesive layer are preferably same as those of the above-mentioned pressure-sensitive adhesive layer.

Also in this embodiment, a protection layer as it will be explained in the second embodiment to be described later may be formed on the transmission type Fourier transform hologram region of the image transforming layer.

Moreover, the protection layer may be formed on the upper entire surface of the image transforming layer (transmission type Fourier transform hologram region and the non hologram region).

Moreover, the hologram observation sheet of this embodiment is used preferably in a state attached with a member to be bonded having a high transparency such as a glass and a transparent plastic resin. Thereby, the optical image obtained by the transmission type Fourier transform hologram region of the image transforming layer can be observed preferably.

B. Second Embodiment

Next, the second embodiment of the hologram observation sheet of the present invention will be explained. The hologram observation sheet of this embodiment is a hologram observation sheet using the above-mentioned hologram sheet, wherein the above-mentioned hologram layer is an image transforming layer comprising the above-mentioned transmission type Fourier transform hologram region and a non hologram region which is other than the transmission type Fourier transform hologram region and without the above-mentioned function, a protection layer is formed on the transmission type Fourier transform hologram region of the image transforming layer, and the above-mentioned pressure-sensitive adhesive layer is formed on the above-mentioned protection layer.

Figure 4:
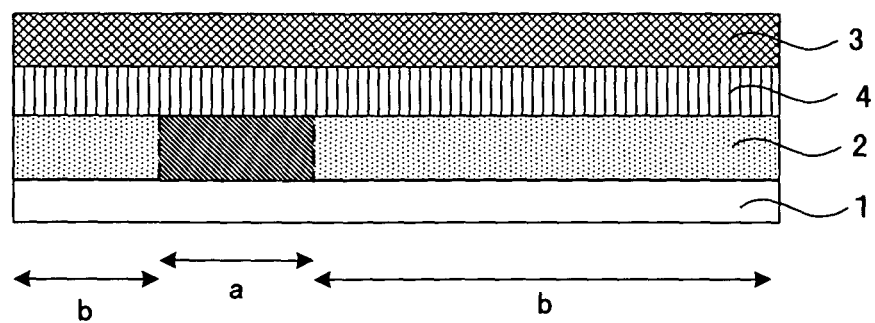
FIG. 4 is a schematic cross-sectional view showing an another example of a hologram observation sheet of the present invention.

For example, as shown in FIG. 4, the hologram observation sheet of this embodiment comprises a transparent substrate 1, an image transforming layer 2 formed on the transparent substrate 1 and having at least a transmission type Fourier transform hologram region "a" and a non hologram region b, a protection layer 4 formed on the transmission type Fourier transform hologram region "a" of the image transforming layer 2, and a pressure-sensitive adhesive layer 3 formed on the protection layer 4.

According to this embodiment, since the pressure-sensitive adhesive layer is formed, a hologram observation sheet to be attached with a desired member such as a glass can be provided. For example, the hologram observation sheet can be used as an advertising medium to be attached on for example the window pane of a vehicle for the public transportation such as a train and a bus, or a decoration member to be attached on the window pane of an automobile or a house. Moreover, in the case the hologram observation sheet is provided with such as the ultraviolet ray absorbing function or the infrared ray absorbing function, it can also be used as various kinds of filters.

Moreover, in general, in the case the pressure-sensitive adhesive layer is formed on a layer having a function of transforming a light beam incident from a point light source into a desired optical image, the refractive index of the layer having the function of transforming the light beam incident from the point light source to the desired optical image is changed so that the optical image formation becomes difficult. However, according to this embodiment, since the protection layer is formed and the pressure-sensitive adhesive layer is formed on the protection layer, the refractive index difference of the transmission type Fourier transform hologram region can remain unchanged so that a hologram observation sheet to be used for various applications can be provided.

Furthermore, according to this embodiment, since the image transforming layer having the transmission type Fourier transform hologram region is formed, a hologram observation sheet can be produced efficiently without the need of additionally attaching or sandwiching a transmission type Fourier transform hologram, and thus it is advantageous. Hereinafter, each configuration of the hologram observation sheet of this embodiment will be explained. Since the above-mentioned transparent substrate and the image transforming layer are same as those explained in the above-mentioned first embodiment, the explanation thereof is omitted here.

1. Pressure-Sensitive Adhesive Layer

First, the pressure-sensitive adhesive layer used in this embodiment will be explained. The pressure-sensitive adhesive layer used in this embodiment is not particularly limited as long as it is formed on the protection layer to be described later, and it can bond the hologram observation sheet of this embodiment and a member to be bonded. The pressure-sensitive adhesive layer may be formed on at least the above-mentioned protection layer. For example, it may be formed on the protection layer in a pattern, or it is formed on the entire surface of the protection layer. Moreover, it may be formed on the non hologram region of the above-mentioned image transforming layer.

Moreover, the pressure-sensitive adhesive layer of this embodiment may also contain an ultraviolet absorber or an infrared absorber. Since the method and material for forming the pressure-sensitive adhesive layer, the haze value, the bonding property, the transparency, or the like are same as those explained in the above-mentioned first embodiment, the detailed explanation thereof is omitted here.

Moreover, the pressure-sensitive adhesive layer of this embodiment may be an adhesive layer having the sticky property, or it may be a re-peelable adhesive layer having the both characteristics of the adhesive property and the re-peelable property. Since the adhesive layer and the re-peelable adhesive layer are same as those explained in the above-mentioned first embodiment, the detailed explanation thereof is omitted here.

2. Protection Layer

Next, the protection layer used in this embodiment will be explained. The protection layer used in this embodiment is not particularly limited as long as it is formed on the transmission type Fourier transform hologram region of the image transforming layer, and it has the function of preventing the pollution of the transmission type Fourier transform hologram region of the image transforming layer and preventing the refractive index difference change of the transmission type Fourier transform hologram region, or the like. In this embodiment, it may be formed on only the transmission type Fourier transform hologram region of the image transforming layer, or it may be formed on the entire surface of the image transforming layer.

Moreover, it is preferable that the protection layer used in this embodiment has the excellent light transmittance allowing transmission of a light beam diffracted by the above-mentioned image transforming layer. It is preferable that the protection layer in this embodiment has a transmittance in a visible light range of 80% or more, more preferably 90% or more. In the case the light transmittance is low, the optical image obtained by the transmission type Fourier transform hologram region of this embodiment may be disturbed. Here, the transmittance of the protection layer can be measured by the JIS K7361-1 (testing method for the total light transmittance of plastic-transparent materials).

Moreover, as the protection layer used in this embodiment, one having a lower haze is preferable. Specifically, those having a haze value in a range of 0.01% to 5% are preferable, those having a haze value in a range of 0.01% to 3% are more preferable, and those having a haze value in a range of 0.01% to 1.5% are particularly preferable. As the above-mentioned haze value, a value measured based on the JIS K7105 is used.

The material for providing the protection layer used in this embodiment is not particularly limited as long as it has the above-mentioned characteristics. As such a material, a rigid material without a flexibility such as a glass and a flexible material having a flexibility can be used, however, in this embodiment, it is preferable to use a flexible material. By the use of the flexible material, for example, the production process for the hologram observation sheet of this embodiment can be a roll-to-roll process so that the productivity of the hologram observation sheet of this embodiment can be excellent.

As the above-mentioned flexible material, for example one made of a thermoplastic resin can be used. As the resin, for example, an olefin based resin such as a polyethylene based resin, a polypropylene based resin, a cyclic polyolefin based resin, a fluorine based resin, and a silicone based resin can be presented. Moreover, as the specific examples of the thermoplastic resins, a polyester (meth) acrylate or a partially hydrolyzed product thereof, a polyvinyl acetate or a hydrolyzed product thereof, a polyvinyl alcohol or a partially acetalized product thereof, a triacetyl cellulose, a polyisoprene, a polybutadiene, a polychloroprene, a silicone rubber, a polystyrene, a polyvinyl butyral, a polyvinyl chloride, a polyallylate, a polyethylene chloride, a polypropylene chloride, a poly-N-vinyl carbazol or a derivative thereof, a poly-N-vinyl pyrrolidone or a derivative thereof, a copolymer of a styrene and a malein anhydride or a semi-ester thereof, a copolymer having at least one of the copolymerizable monomer groups such as an acrylic acid, an ester acrylate, an acrylic amide, an acrylonitrile, an ethylene, a propylene, a vinyl chloride and a vinyl acetate, can be presented. In this embodiment, these thermoplastic resins may be used by one kind or as a mixture of two or more kinds.

The protection layer used in this embodiment may include an additive within a range not to deteriorate the purpose of this embodiment or the above-mentioned haze value. The above-mentioned additive is not particularly limited, and thus it can be selected optionally according to the application of the hologram observation sheet of this embodiment, or the like. As the additive, for example, an ultraviolet absorber, an infrared absorber, a water repelling function providing agent, or a fluorescent whitening agent can be presented.

The thickness of the protection layer used in this embodiment is not particularly limited as long as it has the rigidity in a range not to break the shape of the image transforming layer to be described later by the deformation of the protection layer derived form the external factors. The thickness can be determined optionally according to the kind of the constituent material of the protection layer. It is preferably in a range of, in general, 0.5 µm to 10 mm, and particularly preferably in a range of 1 µm to 5 mm.

Moreover, the method for forming the protection layer is not particularly limited. For example, the image transforming layer and the protection layer may be attached by providing such as a spacer so as to form the air layer between the transmission type hologram region of the image transforming layer and the protection layer; or in the case the protection layer has a certain refractive index difference with respect to the image transforming layer, the protection layer may be formed by applying the above-mentioned resin material on the image transforming layer.

3. Hologram Observation Sheet

Next, the hologram observation sheet of this embodiment will be explained. The shape or the like of the hologram observation sheet of this embodiment can be selected optionally according to the application, and thus it is not particularly limited as long as it comprises the transparent substrate, the image transforming layer, the protection layer and the pressure-sensitive adhesive layer.

Moreover, in this embodiment, the layer configuration, or the like is not particularly limited as long as the above-mentioned layers are provided. For example, a printing layer may be formed on the above-mentioned transparent substrate, the non hologram region of the image transforming layer, or the protection layer. Moreover, a release substrate may be disposed on the boding-layer. Furthermore, as needed, an ultraviolet ray absorbing layer or an infrared ray absorbing layer, a reflection preventing layer, or the like may be formed on the transparent substrate, the non hologram region of the image transforming layer, or the protection layer. Moreover, a self supporting property substrate may be formed between the protection layer and the pressure-sensitive adhesive layer. In the case the self supporting property substrate is formed, it is preferable that the substrate pressure-sensitive adhesive layer is provided between the self supporting property substrate and the protection layer.

Since the printing layer, the release substrate, the ultraviolet ray absorbing layer, the infrared ray absorbing layer, the reflection preventing layer, or the like are same as those explained in the above-mentioned first embodiment, the detailed explanation thereof is omitted here. Moreover, since the above-mentioned self supporting property substrate and the substrate pressure-sensitive adhesive layer are same as those explained in the above-mentioned first embodiment, the detailed explanation thereof is also omitted here.

Moreover, it is preferable that the hologram observation sheet of this embodiment is also used in a state attached on a member to be bonded having a high transparency such as a glass and a transparent plastic resin. Thereby, the optical image obtained by the transmission type Fourier transform hologram region of the image transforming layer can be observed preferably.

III. Blinding Device

Next, the blinding device of the present invention will be explained. The blinding device of the present invention is a blinding device not to sharply show the transmitted background, using the above-mentioned hologram sheet.

Figure 5:
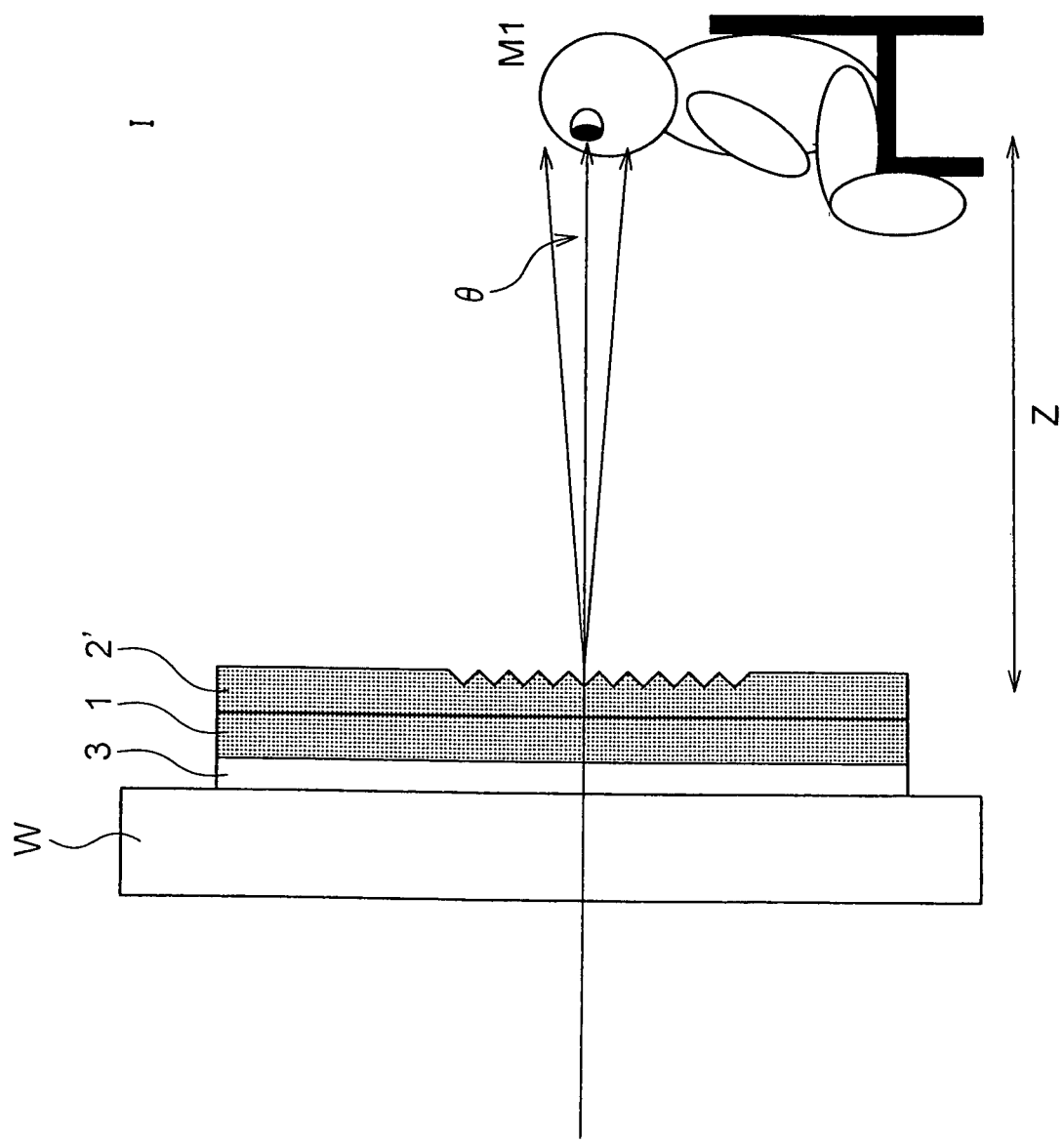
FIG. 5 is a diagram showing an embodiment of a blinding device of the present invention.

FIG. 5 is a diagram showing an embodiment of the blinding device of the present invention. In FIG. 5, 2' is a hologram layer, 1 is a transparent substrate, 3 is a pressure-sensitive adhesive layer, W is a window pane, I is the inside, O is the outside, M1 is a person in a room comprising the subject to be shielded, Z is the distance between the person and the hologram layer, and θ is a diffraction angle. In general, the blinding device comprises the hologram layer 2', the transparent substrate 1 and the pressure-sensitive adhesive layer 3, so as to be attached on the window pane W by the pressure-sensitive adhesive layer 3, and it is used for not showing the person M1 in the room sharply from the outside O.

The hologram layer 2' in this embodiment is a phase type Fourier transform hologram. The Fourier transform hologram may either be a computer generated hologram or a surface relief type, amplitude type, or a volume type. According to the volume type hologram, the blinding angle can be controlled by the angle selection property. Furthermore, the Fourier transform hologram may comprise a spatial modulator such as a liquid crystal so as to control the blinding degree for the entirety or a part of the device. Moreover, it may be a Fourier transform hologram having the diffraction efficiency of a zero order light beam (non diffracted light beam) of 30%, preferably 10% or less.

In the case the inside is viewed through the blinding device from the outside O of the window pane W, with the premise that Z is the distance between the person M1 as the substrate to be shielded and the hologram layer 2', and θ is the diffraction angle, since the images in a range of 2Z tan θ are provided, it cannot be viewed sharply. In this embodiment, assuming a person sitting in such as a restaurant, the distance Z between the person M1 in the room and the hologram layer 2' is set at 500 mm. Moreover, assuming that the person cannot be recognized if the images of human eyes are provided, with the premise that the size of human eyes is about 30 mm, $2Z \tan \theta$ is set at 30 mm. Then, $2 \times 500$ mm$\times \tan \theta = 30$ mm, so that $\theta = \arctan (30/2/500) = 1.718$ degrees. Here, with the premise that the pitch in the case of providing the hologram layer 2' as a computer generated hologram is d, in the case of $d=\lambda/\sin \theta$, $\lambda=600$ nm ($\lambda$ is the wavelength), $d=600$ nm/sin 1.718 degrees=about 20 µm. That is, the hologram layer 2' is provided with about a 20 µm pitch or less. Here, the window pane W may be a transparent member.

Figure 6:
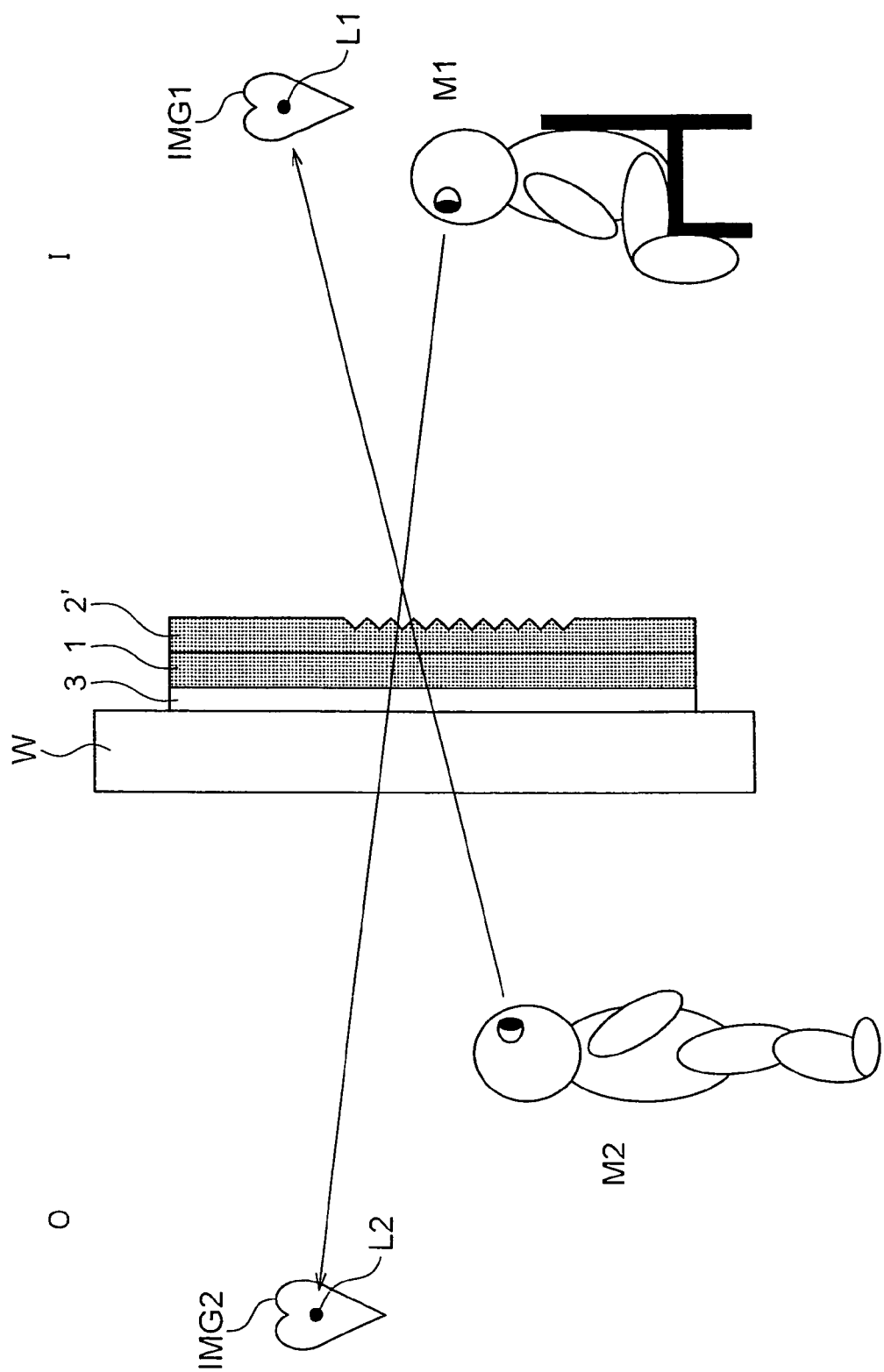
FIG. 6 is a diagram showing another function that a blinding device of the present invention has.

FIG. 6 is a diagram in the case of viewing a point light source L through the blinding device of this embodiment. L1 is a point light source in the room, L2 is a point light source in the outside, IMG1 is a pattern in the room, IMG2 is a pattern in the outside, and M2 is a person outside. First, as it is explained for FIG. 5, the person M1 in the room cannot be recognized by the person M2 outside. Next, in the case the person M2 outside views the point light source L1 in the room, the pattern IMG1 in the room is observed as if it is coming up to the front together with the point light source L1 in the room. Moreover, in the case the person M1 in the room views the point light source L2 of the outside, the outside pattern IMG2 is observed as if it is coming up to the front together with the point light source L2 of the outside.

The hologram sheet may be provided in a state sandwiched by two transparent plates comprising the glass window W so as to facilitate mounting. Furthermore, the hologram sheet may be of the slide type or the roll screen type for covering the window so as to be used only when it is needed. At the time, it may be stored in the wall.

Moreover, the pitch d of the hologram layer 2' can be changed according to where the position disabling the recognition is set. Furthermore, it may be applied not only for the window for separating the inside and the outside, but also for the vehicles such as an automobile, a train, an airplane and a ship, and various places such as a partition screen and a show window. In particular, in the case of 20 µm pitch or less, it is optimum for the window of such as the restaurant or the automobile. Moreover, at the time of using for a vehicle, the vehicle may be provided with a point light source.

Figure 7:
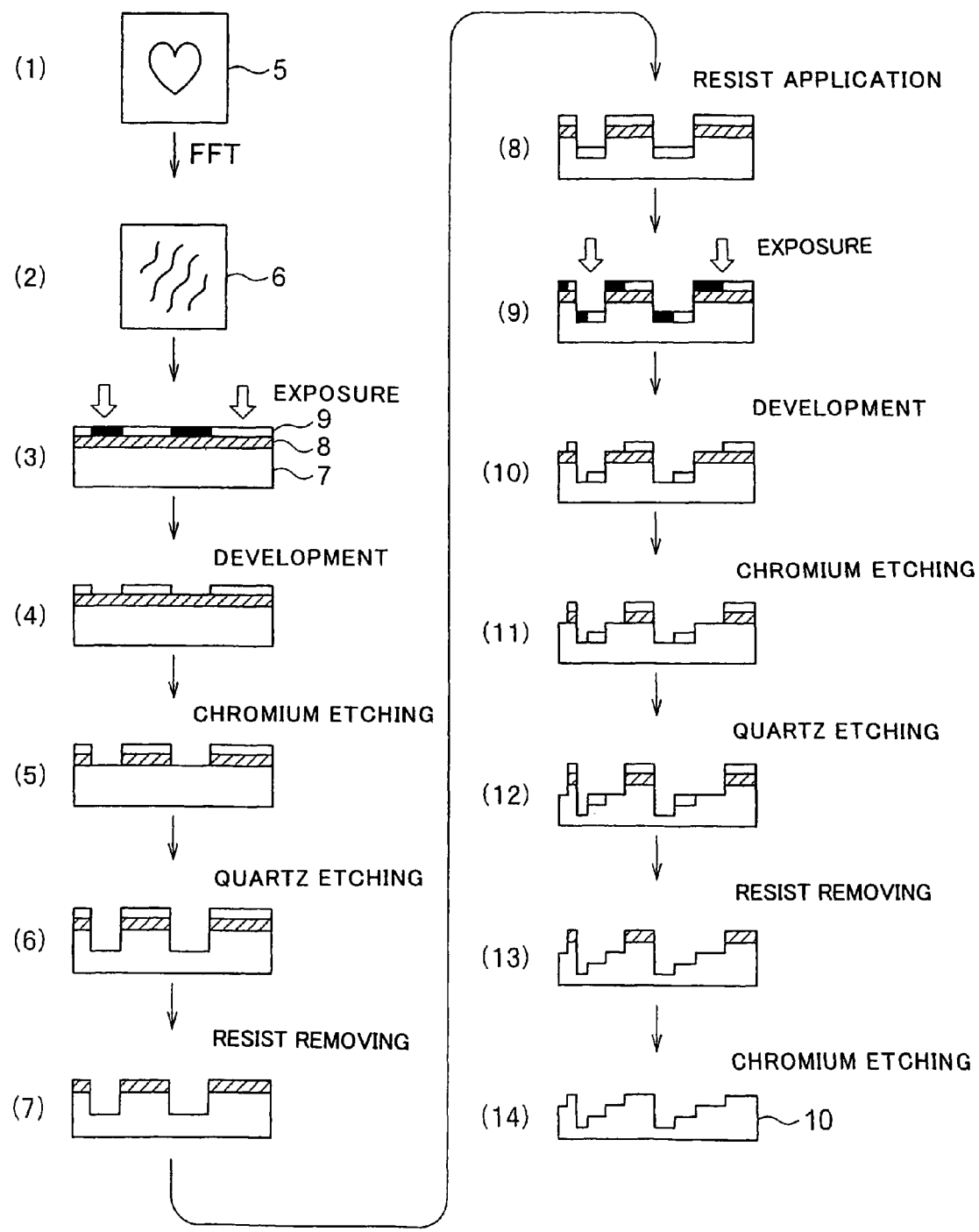
FIG. 7 is a diagram showing a production method for an original master of a blinding device of the present invention.

Hereinafter, with reference to the drawings, the production method for a hologram used for the blinding device of the present invention will be explained. FIG. 7 is a diagram showing the processes for carrying out the production method for an original master of a hologram of the present invention. 5 is an original image, 6 is a Fourier transform image, 7 is a substrate, 8 is a chromium layer, 9 is a photo resist, and 10 is an original master. The substrate 7 is a glass or silicon original master, or the like.

First, in the step (1), the original image 5 is produced, and then in the step (2), the Fourier transform image 6 of the original image 5 is produced by computer generating the FFT, or the like with a computer. The Fourier transform image 6 is a Fourier transform image 6 provided as a multi-value of a binary value or more. Then, in the step (3), a latent image of a concavo-convex pattern is formed on the photo resist 9 by applying such as electron beam graphic exposure or mask exposure to the chromium layer 8, and the photo resist 9 coated on the substrate 7. Then, in the step (4), the latent image of the photo resist is positively developed. Then, in the step (5), the chromium layer 8 is etched by wet etching according to the photo resist pattern for removing the excessive chromium. Subsequently, in the step (6), the substrate 7 is etched and removed by a predetermined depth by dry etching. Then, in the step (7), the remaining photo resist 9 is removed.

Then, in the step (8), the photo resist 9 is applied again on the entire surface. Then, in the step (9), electron beam graphic exposure or mask exposure is applied, and it is developed in the step (10). Subsequently, in the step (11), the chromium layer 8 is etched by wet etching according to the photo resist pattern. Then, in the step (12), the substrate 7 is etched by dry etching. At the time, it is carried out for the depth half of the etching carried out in the step (6). Subsequently, in the step (13), the remaining photo resist is removed, and in the step (14), the all remaining chromium is removed. According to the process, the original master 10 can be obtained.

Figure 8:
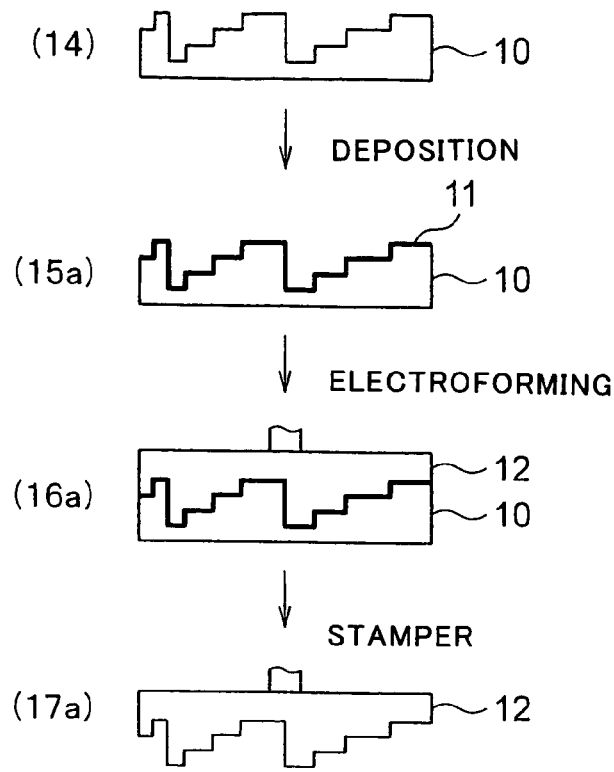
FIG. 8 is a diagram showing a production method for a stamper of the present invention.
Figure 9:
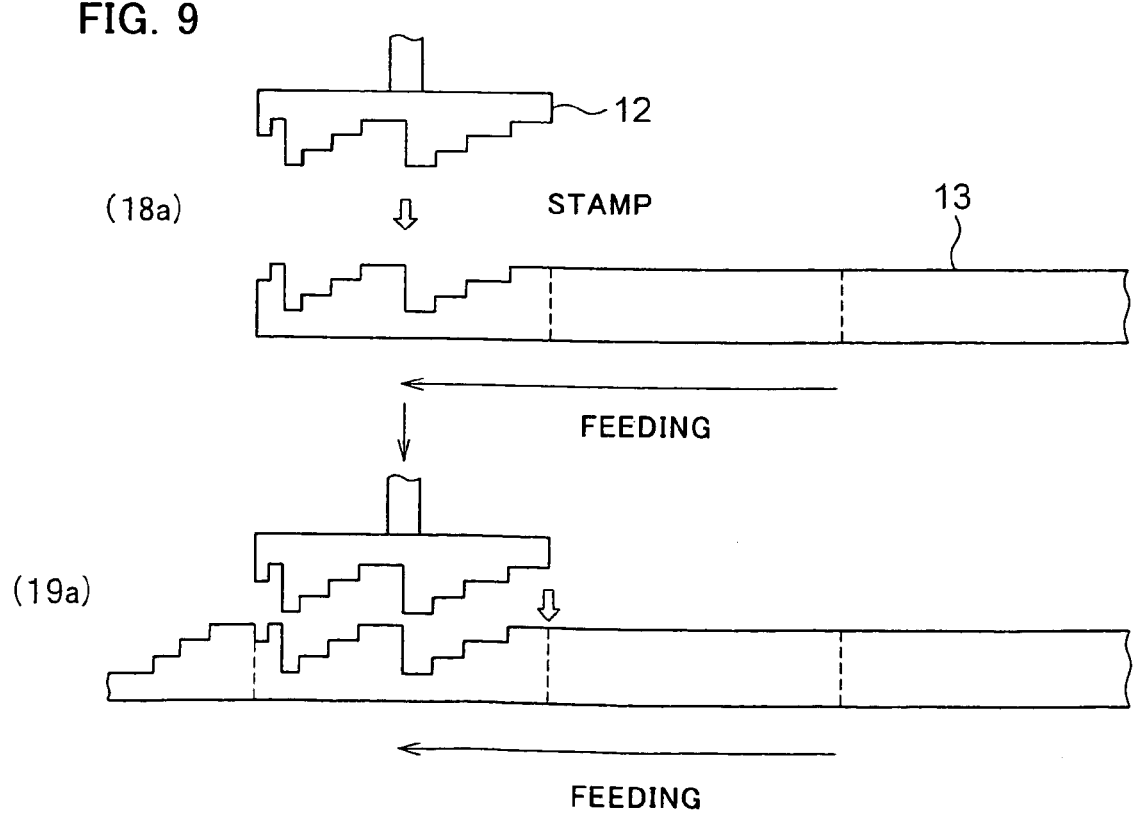
FIG. 9 is a diagram showing a first production method for a large sized blinding device of the present invention.

FIGS. 8 and 9 show the case of using a stamper as a first embodiment. FIG. 8 is a diagram showing the process for producing the stamper. 10 is an original master, 11 is a conductive film and 12 is a stamper. First, in the step (15a), the conductive film 11 is deposited on the original master 10 obtained in the step (14). Then, in the step (16a), nickel plating (electroforming) is carried out, and in the step (17a), the original master 10 is removed so as to form a mold as the stamper 12.

Next, FIG. 9 shows the process for enlarging the Fourier transform hologram by the stamper produced in FIG. 8. 12 is a stamper, and 13 is a thermoplastic resin. In the step (18a), pressuring stamp is carried out for the thermoplastic resin 13 by the stamper 12 produced in the step (17a), and the thermoplastic resin 13 is conveyed for the width of the stamper 12 and stopped. In the step (19a), the pressuring stamp is carried out in the portion of the thermoplastic resin 13 adjacent to the portion with the pressuring stamp applied in the step (18a), and the thermoplastic resin 13 is conveyed again for the width of the stamper 12 and stopped. By repeating the process, a large size can be realized.

Figure 10:
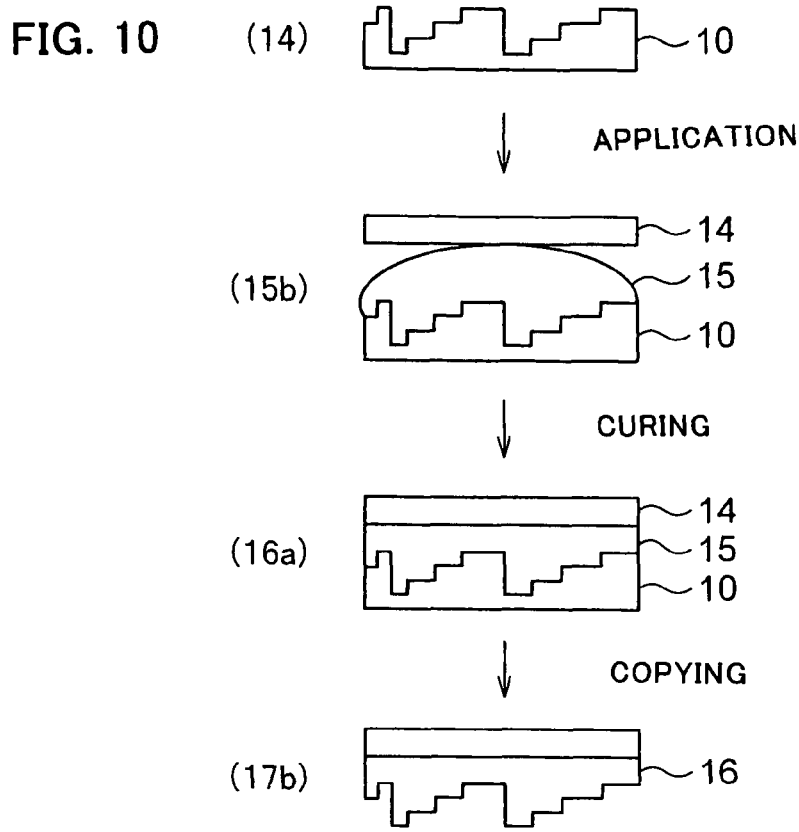
FIG. 10 is a diagram showing a production method for UV cured original master for copying of the present invention.
Figure 11:
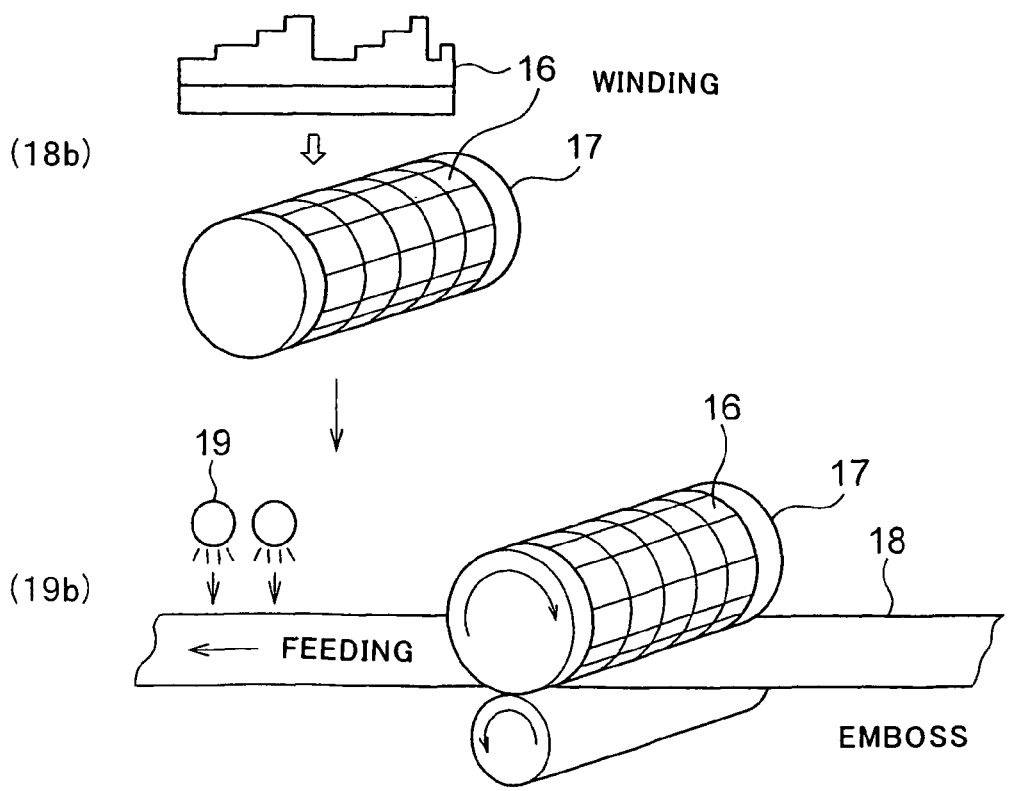
FIG. 11 is a diagram showing a second production method for a large sized blinding device of the present invention.

FIGS. 10 and 11 show the case of using a UV cured original master for copying as the second embodiment. FIG. 10 is a diagram showing the process of producing the UV cured original master for copying. 10 is an original master, 14 is a substrate for a copying original master, 15 is a UV curing resin, and 16 is a UV cured original master for copying. First, in the step (15b), the UV curing resin 15 is applied on the original master 10 obtained in the step (14), and then, the substrate for a copying original master 14 is pressed thereon. For the substrate for a copying original master 14, a PET film, a polycarbonate film, or the like can be used. Then, in the step (16b), UV irradiation is carried out for curing the UV curing resin 15. Subsequently, in the step (17b), by removing the original master 10, the UV cured original master for copying 16 can be formed.

Next, FIG. 11 shows a process for enlarging the Fourier transform hologram by the UV cured original master for copying 16 produced in FIG. 10. 16 is a UV cured original master for copying, 17 is an emboss roller, 18 is a substrate with a UV curing resin applied, and 19 is a UV irradiating device. In the step (18b), the UV cured original master for copying 16 produced in the step (17b) is disposed in the periphery of the emboss roller 17. Subsequently, in the step (19b), by rotating the emboss roller 17 with the substrate 18 with a UV curing resin applied clamped by the emboss roller 17 disposed in the periphery of the UV cured original master for copying 16 and the other rollers provided below the emboss roller 17, the substrate 18 with a UV curing resin applied can be conveyed while forming the emboss pattern so as to have the UV irradiation by the UV irradiating device at the downstream side so as to be cured and enlarged.

Figure 12:
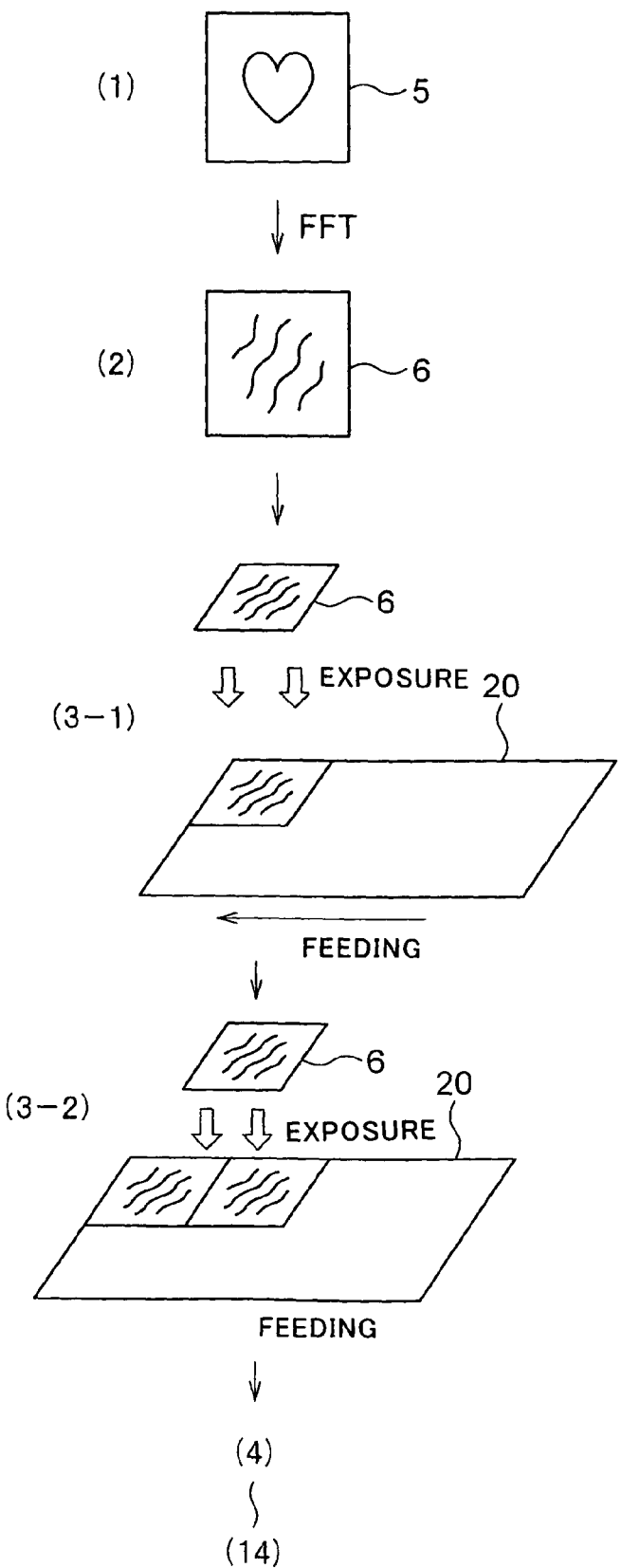
FIG. 12 is a diagram showing another production method for a large sized blinding device of the present invention.
Figure 13A:
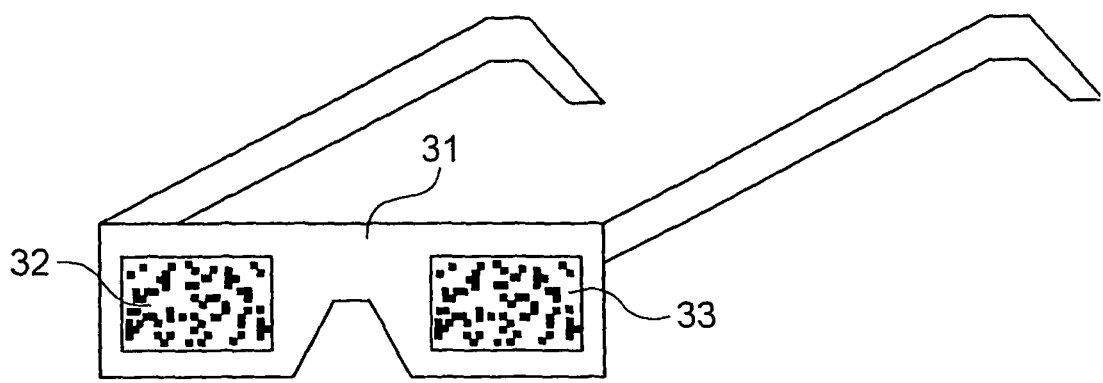
FIGS. 13A to 13C are each a diagram explaining the conventional hologram.
Figure 13B:
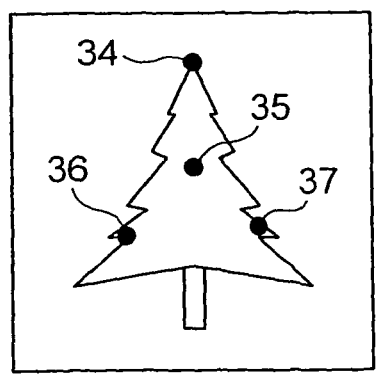
Figure 13C:
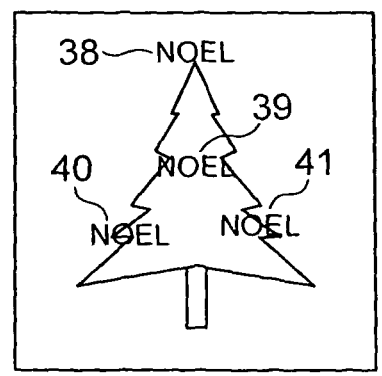
Figure 14A:
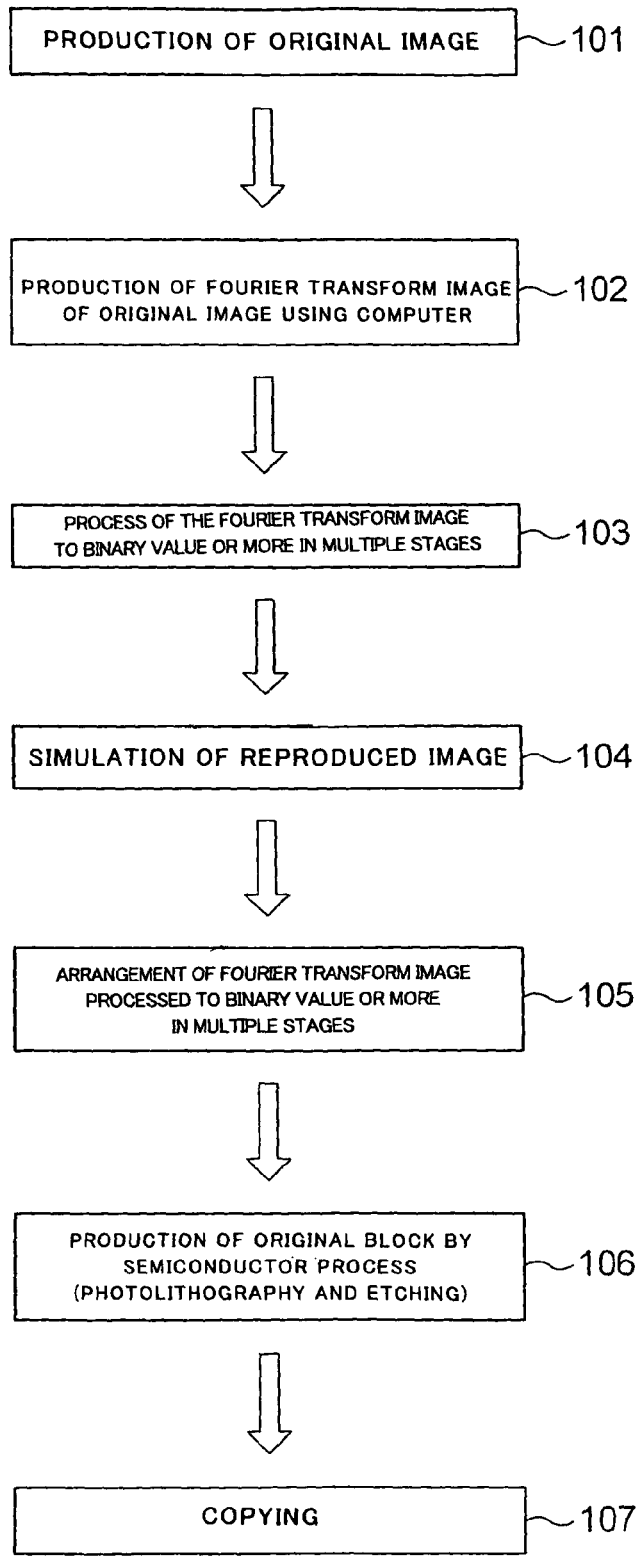
FIGS. 14A to 14B are each a diagram showing the conventional production method of copying.
Figure 14B:
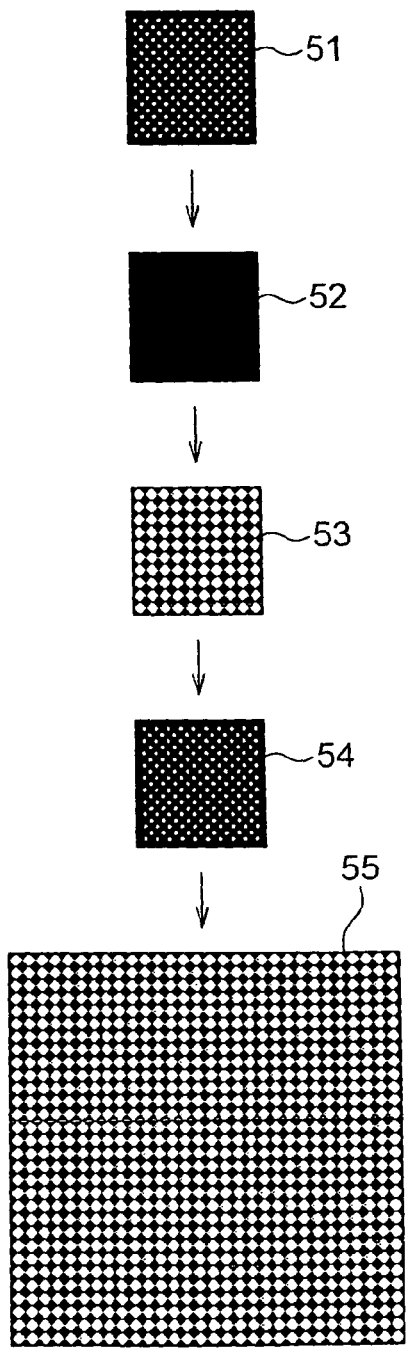
Figure 15:
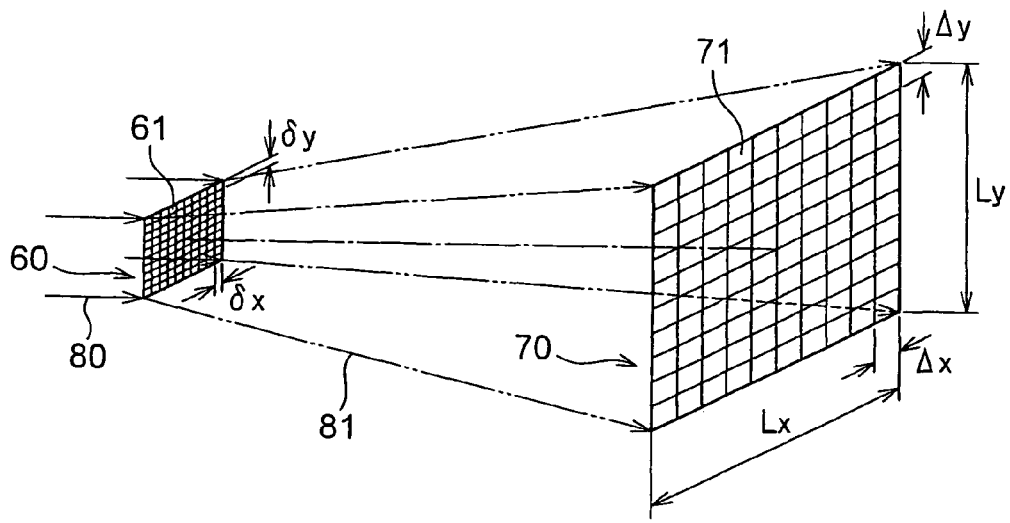
FIG. 15 is a diagram schematically showing the conventional computer generated hologram and an image area reproduced thereby.
Figure 16:
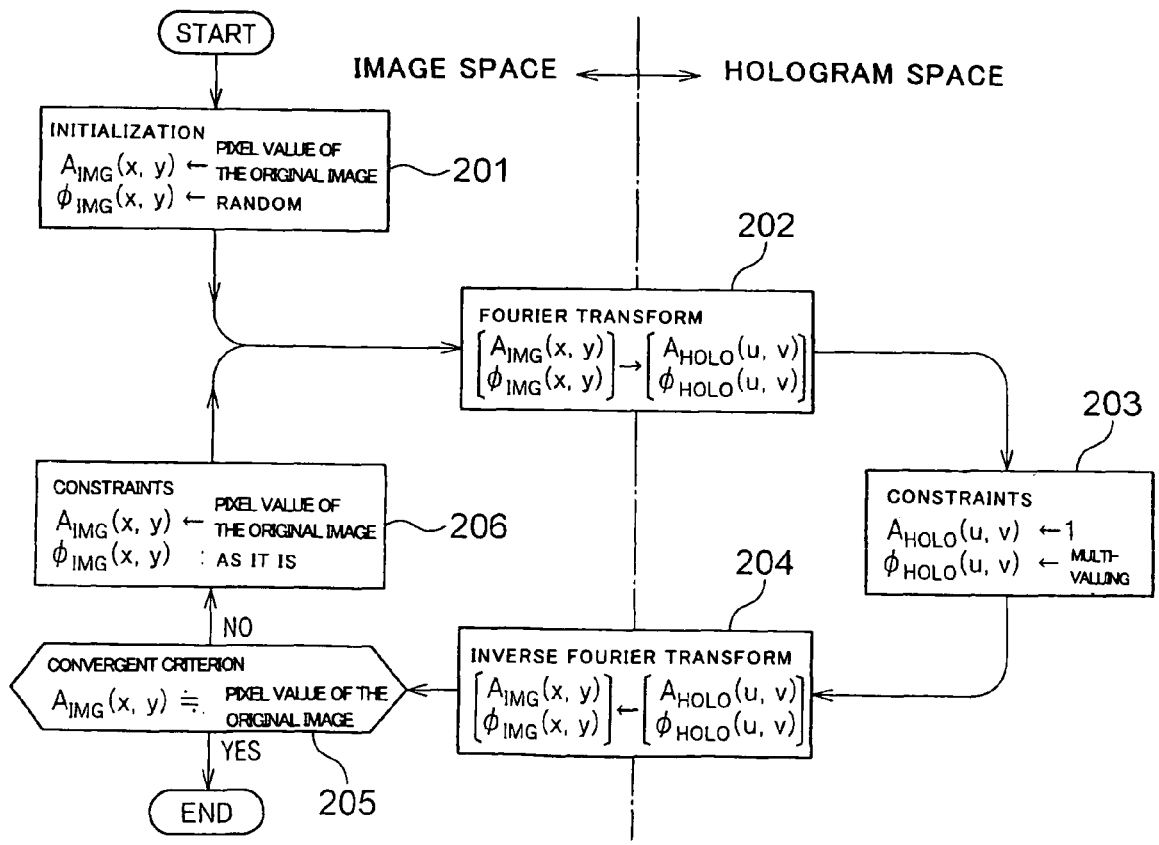
FIG. 16 is a flow chart for obtaining the conventional computer generated hologram.
Figure 17:
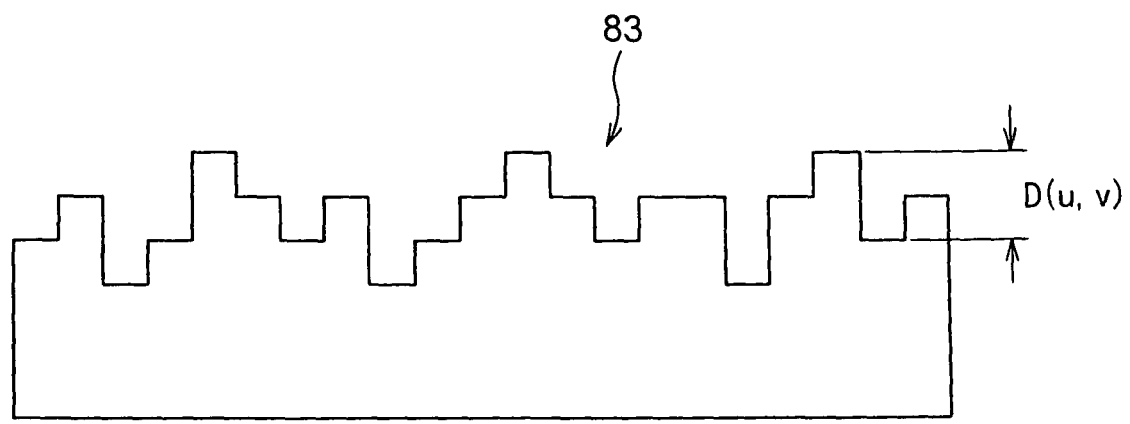
FIG. 17 is a cross-sectional view showing a configuration example of the conventional computer generated hologram.

Then, another embodiment for enlargement will be explained with reference to FIG. 12. FIG. 12 is a diagram showing a step-and-repeat method for directly enlarging without using the original master 10. 20 is a large size substrate. The step (1) and the step (2) are the same processes as those explained in FIG. 7 for producing a Fourier transform image 6. As the UV copying original master 16, the enlarged Fourier transform hologram obtained in the step (19a) of FIG. 9 can be used as well.

Then, in the step (3-1), the large size substrate 20 has the chromium layer 8 and the photo resist 9 applied as that explained in the step (3) of FIG. 7. Electron beam graphic exposure, mask exposure, or the like is applied to the large size substrate 20 for forming a concavo-convex pattern latent image on the photo resist. Then, the large size substrate 20 is conveyed for the size of the width of the Fourier transform image 6 and stopped. Subsequently, in the step (3-2), electron beam graphic exposure, mask exposure, or the like is applied again to the large size substrate 20 for forming a concavo-convex pattern latent image in the photo resist. Then, the large size substrate 20 is conveyed for the size of the width of the Fourier transform image 6 and stopped. By repeating this, the large size substrate 20 is exposed.

Next, by applying the process form the steps (4) to (14) shown in FIG. 7 to the large size substrate 20, a large size can be realized. Therefore, a large size blinding device can be produced so that it can be applied for various substances owing to the enlargement of the applications.

The present invention is not limited to the above-mentioned embodiments. The above-mentioned embodiments are examples, and thus any case having the substantially same configuration as the technological idea disclosed in the claims of the present invention with the same effects is incorporated in the technological scope of the present invention.

EXAMPLES

Hereinafter, the present invention will be explained further specifically with reference to the examples and the comparative examples.

Example 1

Formation of an Original Master, and a Transparent Substrate Having an Image Transforming Layer A resist for dry etching was rotation-applied by a spinner on the chromium thin film of a photo mask blank plate with a surface low reflection chromium thin film laminated on a synthetic quartz substrate. As the resist for dry etching, ZEP7000 produced by ZEON CORPORATION was used so as to be formed by a 400 nm thickness. The exposure of a pattern produced preliminarily with a computer was carried out to the resist layer using an electron beam graphic device (MEBES4500: produced by Etec Systems, Inc.) so as to have the exposed portion of the resist resin easily soluble. Thereafter, the easily soluble portion was removed by spraying a developing solution (spray development) for forming a resist pattern.

Subsequently, utilizing the formed resist pattern, the chromium thin film in the portion not covered with the resist was removed by dry etching for revealing the quartz substrate. Then, by etching the revealed quartz substrate, a concave part was formed in the quartz substrate. Thereafter, by dissolving and removing the resist thin film, an original master having the concave part generated by etching the quartz substrate, and a convex part with the quartz substrate and the chromium thin film remained without being etched was obtained.

An image transforming layer forming composition (UV curable acrylate resin: refractive index 1.52, measurement wavelength 633 nm) was dropped onto the original master having the concavo-convex. With a 0.5 mm thickness polycarbonate sheet (transparent substrate) placed thereon, they were pressed. Then, by directing an active radiation, the image transforming layer forming composition was cured and then removed so as to produce a transparent substrate having an image transforming layer having the concavo-convex image with the concavo-convex shape of the original master inverted. The portion to be the non hologram region was provided as a flat plane.

<Formation of the Pressure-Sensitive Adhesive Layer (Adhesive Layer)>

In the above-mentioned transparent substrate having an image transforming layer, a pressure-sensitive adhesive layer forming coating solution of the following composition was applied with an applicator on the surface on the side opposite to the side with the image transforming layer formed so as to provide a hologram observation sheet of the present invention. The film thickness after drying was 20 µm.

| (Composition of the pressure-sensitive adhesive layer forming coating solution) | |
|---|---|
| Acrylic based sticky agent ("NISSETSU PE-118" produced by NIPPON CARBIDE INDUSTRIES CO., INC.) | 100 parts by weight |
| Isocyanate cross-linking agent ("NISSETSU CK-101" produced by NIPPON CARBIDE INDUSTRIES CO., INC.) | 16 parts by weight |
| Methyl ethyl ketone | 30 parts by weight |
| Toluene | 15 parts by weight |
| Ethyl acetate | 15 parts by weight |

<Evaluation>

According to the observation of the point light source through the glass plate with the bonding surface of the hologram observation sheet with the pressure-sensitive adhesive layer (adhesive layer) formed attached on a glass plate, a predetermined Fourier transformed image was observed. Moreover, the background transmitting the glass plate was not sharply observed.

Example 2

Formation of an Original master, and a Transparent Substrate Having an Image Transforming Layer In the same manner as in the example 1, an original master was produced, and an image transforming layer was formed on a transparent substrate.

<Formation of a Protection Layer and a Pressure-Sensitive Adhesive Layer (Adhesive Layer)>

A (coating solution CAT-1300S: produced by Teikoku Printing Inks Mfg. Co., Ltd.) was screen-printed in a pattern form as a spacer and an adhesive on an acrylic plate (product name: PARAGLASS® thickness 2 mm: produced by KURARAY CO., LTD.). With a release paper attached on the printed surface, it was prepared as a protection layer forming member. The spacer and adhesive was formed in a pattern in the portion to provide the non hologram region.

Subsequently, with the release paper of the above-mentioned protection layer forming member removed, it was pressed on the image transforming layer side of the transparent substrate having the image transforming layer so as to be attached. The attached product was punched out to a predetermined size (5 cm×5 cm) for processing.

Thereafter, by the same method as in the example 1, the pressure-sensitive adhesive layer (adhesive layer) was formed on the above-mentioned protection layer so as to provide a hologram observation sheet of the present invention.

<Evaluation>

According to the observation of the point light source through the glass plate with the bonding surface of the hologram observation sheet with the pressure-sensitive adhesive layer (adhesive layer) formed attached on a glass plate, a predetermined Fourier transformed image was observed. Moreover, the background transmitting the glass plate was not sharply observed.

Example 3

Formation of an Original Master, a Transparent Substrate Having an Image Transforming Layer, and a Pressure-Sensitive Adhesive Layer (Adhesive Layer)

In the same manner as in the example 1, an original master was produced, and an image transforming layer was formed on a transparent substrate. Thereafter, a pattern printing was applied to the non hologram region of the image transforming layer by screen printing. As to the printing operation, a white printing layer was provided as the base, and a pattern printing was applied thereon.

Subsequently, in the same manner as in the example 1, a pressure-sensitive adhesive layer (adhesive layer) was formed on the surface on the side opposite to the side with the image transforming layer formed of the transparent substrate so as to provide a hologram observation sheet of the present invention.

<Evaluation>

According to the observation of the point light source through the glass plate with the bonding surface of the hologram observation sheet with the pressure-sensitive adhesive layer (adhesive layer) formed attached on a glass plate, a predetermined Fourier transformed image was observed. Moreover, the background transmitting the glass plate was not sharply observed.

Example 4

Formation of an Original Master, and a Transparent Substrate Having an Image Transforming Layer In the same manner as in the example 1, an original master was produced, and an image transforming layer was formed on a transparent substrate.

<Formation of a Protection Layer Having a Release Substrate>

A pressure-sensitive adhesive layer forming coating solution used in the example 1 was applied on a surface mold releasing process PET film (SP-PET (50 µm): produced by TOHCELLO CO,. LTD,) with an applicator for processing so as to have the film thickness after drying of 20 µm.

Subsequently, by laminating the pressure-sensitive adhesive layer surface of the surface mold releasing process PET film on the surface of the side opposite to the side with the image transforming layer formed on the transparent substrate, a hologram observation sheet with a release substrate was produced.

<Evaluation>

When the surface mold releasing process PET film was removed, the boding layer (adhesive layer) was moved to the transparent sheet side. Thereafter, according to the observation of the point light source through the glass plate with the pressure-sensitive adhesive layer surface attached on the glass plate, a predetermined Fourier transformed image was observed. Moreover, the background transmitted the glass plate was not observed sharply.

Example 5

Formation of an Original Master, and a Transparent Substrate Having an Image Transforming layer In the same manner as in the example 1, an original master was produced, and an image transforming layer was formed on a transparent substrate.

<Formation of a Re-peelable Adhesive Layer Having a Release Substrate>

A re-peelable adhesive layer having a release substrate was formed by applying a re-peelable adhesive agent having the following composition on a peeling sheet (silicone separator of a 50 µm thickness, SP-PET; produced by TOHCELLO CO,. LTD.) by a 10 µm dry film thickness.

| (Composition of a re-peelable adhesive agent) | |
| --- | --- |
| Acrylic based adhesive agent ("SK dine 1473H" produced by Soken Chemical & Engineering Co., Ltd.) | 100 parts by weight |
| Curing agent ("L45" produced by Soken Chemical & Engineering Co., Ltd.) | 3 parts by weight |

Subsequently, by laminating the re-peelable adhesive layer surface of the re-peelable adhesive layer having a release substrate onto the surface on the side opposite to the side with the image transforming layer formed of the transparent substrate, a hologram observation sheet having a release substrate was produced.

<Evaluation>

According to the observation of the point light source through the glass plate with the release substrate removed form the re-peelable adhesive layer of the hologram observation sheet and the pressure-sensitive adhesive layer surface attached on the glass plate, a predetermined Fourier transformed image was observed. Moreover, the hologram observation sheet was removed 7 days after attaching the hologram observation sheet on the glass plate so that the hologram observation sheet was removed neatly without generating the residual adhesive agent. Moreover, the background transmitted the glass plate was not observed sharply.

Example 6

Formation of an Original Master, and a Transparent Substrate Having an Image Transforming Layer In the same manner as in the example 1, an original master was produced, and an image transforming layer was formed on a transparent substrate.

<Formation of the Re-peelable Adhesive Layer and the Release Substrate>

In the above-mentioned transparent substrate having the image transforming layer, a re-peelable adhesive layer forming coating solution having the following composition was applied on the surface on the side opposite to the side with the image transforming layer formed with an applicator so as to have the film thickness after drying of 20 µm. Then, by drying at 150° C., and subsequently at 100° C., a re-peelable adhesive layer was formed.

| (Composition of the re-peelable adhesive layer forming coating solution) | |
|---|---|
| Silicone based non solvent peeling agent ("KNS-316" produced by Shin-Etsu Chemical Co., Ltd.) | 100 parts by weight |
| Platinum catalyst ("PL-50T" produced by Shin-Etsu Chemical Co., Ltd.) | 2 parts by weight |

Subsequently, by laminating a 25 μm thickness PET substrate (Lumirror #25T60; produced by Toray Industries, Inc.) on the re-peelable adhesive layer at a room temperature, a hologram observation sheet having a release substrate was produced.

<Evaluation>

According to the observation of the point light source through the glass plate with the release substrate removed form the re-peelable adhesive layer of the hologram observation sheet and the pressure-sensitive adhesive layer surface attached on the glass plate, a predetermined Fourier transformed image was observed. Moreover, the hologram observation sheet was attached on the glass substrate without bubble introduction. Moreover, even in the case it is removed from the glass plate, it can be adhered again. Furthermore, at the time of removing the hologram observation sheet, the hologram observation sheet was removed neatly without generating a trace on the glass plate. Moreover, the background transmitted the glass plate was not observed sharply.

Example 7

Formation of an Original Master, and a Transparent Substrate Having an Image Transforming Layer In the same manner as in the example 1, an original master was produced, and an image transforming layer was formed on a transparent substrate.

<Formation of the Self Supporting Property Substrate and the Substrate Pressure-sensitive Adhesive Layer>

A re-peelable adhesive layer and a release substrate were formed on a self supporting property substrate (Lumirror #50T60; produced by Toray Industries, Inc.) in the same manner as in the example 6.

Subsequently, a substrate pressure-sensitive adhesive layer was formed on the surface on the side opposite to the side with the re-peelable adhesive layer of the self supporting property substrate formed by coating the same pressure-sensitive adhesive layer forming coating solution used in the example 1. Next, the hologram observation sheet of the present invention was provided by adhering, on the substrate pressure-sensitive adhesive layer, the surface on the transparent substrate side of the transparent substrate having the image transforming layer.

<Evaluation>

According to the observation of the point light source through the glass plate with the release substrate removed form the re-peelable adhesive layer of the hologram observation sheet and the pressure-sensitive adhesive layer surface attached on the glass plate, a predetermined Fourier transformed image was observed. Moreover, the hologram observation sheet was attached on the glass substrate without bubble introduction. Moreover, even in the case it is removed from the glass plate, it can be adhered again. Furthermore, at the time of removing the hologram observation sheet, the hologram observation sheet was removed neatly without generating a trace on the glass plate. Moreover, the background transmitted the glass plate was not observed sharply.

What is claimed is:

1. A method for making a subject to be shielded invisible comprising the steps of:
    preparing a hologram sheet that comprises a transparent substrate, a hologram layer formed on a front surface of the transparent substrate and having a transmission type Fourier transform hologram region which has a pitch of 20 μm or less and with a function of reconstructing an optical image with a light beam incident from a point light source and a non hologram region which is other than the transmission type Fourier transform hologram region and without the function, and a pressure-sensitive adhesive layer which is formed on either:
        a back surface of the transparent substrate which is opposite to a side where the hologram layer is formed, or the hologram layer;
    making a subject to be shielded which is 30 mm in diameter invisible by viewing the subject to be shielded through the hologram sheet,
    wherein, during the step of making the subject to be shielded invisible, when the subject to be shielded is disposed at a position facing the front surface of the transparent substrate at a distance of 500 mm from the hologram layer, the subject to be shielded is made invisible from a viewing position disposed at a position facing the back surface of the transparent substrate by viewing the subject to be shielded through the transmission type Fourier transform hologram region in the hologram layer.

2. The method for making a subject to be shielded invisible according to claim 1, wherein the hologram layer is provided as a phase type computer generated hologram.

3. The method for making a subject to be shielded invisible according to claim 1, wherein the hologram sheet is attached to a window.

4. The method for making a subject to be shielded invisible according to claim 1, wherein the hologram sheet is sandwiched between windows comprising two transparent plates.

5. The method for making a subject to be shielded invisible according to claim 1, wherein the hologram sheet is configured to cover a window and configured to be slidably retracted to expose an aperture.

6. The method for hiding making a subject to be shielded invisible according to claim 1, further comprising a roll screen system comprising the hologram sheet and wherein the hologram sheet is configured to cover a window.

7. The method for hiding making a subject to be shielded invisible according to claim 1, wherein the subject to be shielded invisible is a portion of a larger object which is visually obscured by the hologram sheet.

* * * * *